(12) United States Patent
Yamaguchi

(10) Patent No.: US 6,291,915 B1
(45) Date of Patent: Sep. 18, 2001

(54) ECCENTRIC ROTOR FOR A COMPACT VIBRATOR MOTOR AND THE COMPACT VIBRATOR MOTOR INCORPORATING THE ECCENTRIC ROTOR

(75) Inventor: Tadao Yamaguchi, Isesaki (JP)

(73) Assignee: Tokyo Parts Industrial Co., Ltd., Isesaki (JP)

( * ) Notice: Subject to any disclaimer, the term of this patent is extended or adjusted under 35 U.S.C. 154(b) by 0 days.

(21) Appl. No.: 09/409,348

(22) Filed: Sep. 30, 1999

(30) Foreign Application Priority Data

| Jan. 28, 1999 | (JP) | 11-019304 |
|---|---|---|
| Mar. 15, 1999 | (JP) | 11-068270 |
| Mar. 31, 1999 | (JP) | 11-093020 |
| Jun. 2, 1999 | (JP) | 11-154498 |
| Jul. 15, 1999 | (JP) | 11-201596 |
| Sep. 6, 1999 | (JP) | 11-251086 |

(51) Int. Cl.$^7$ .................. H02K 11/00; H02K 7/06; H02K 39/08; H02K 39/06
(52) U.S. Cl. .................. 310/71; 310/81; 310/DIG. 6; 310/234; 310/237
(58) Field of Search .................. 310/71, 81, DIG. 6, 310/40 MM, 233, 234, 235, 237

(56) References Cited

U.S. PATENT DOCUMENTS

| 4,661,733 | * | 4/1987 | Heyraud | 310/68 R |
|---|---|---|---|---|
| 5,036,239 | * | 7/1991 | Yamaguchi | 310/268 |
| 5,107,155 | | 4/1992 | Yamaguchi | 310/81 |
| 5,341,057 | | 8/1994 | Yamaguchi et al. | 310/81 |
| 5,793,133 | * | 8/1998 | Shiraki et al. | 310/81 |
| 5,942,833 | * | 8/1999 | Yamaguchi | 310/268 |
| 6,011,333 | * | 1/2000 | Yamaguchi et al. | 310/81 |

FOREIGN PATENT DOCUMENTS

| 2390070 | 12/1990 | (JP) . |
|---|---|---|
| 681443 | 3/1994 | (JP) . |
| 9261918 | 10/1997 | (JP) . |

* cited by examiner

*Primary Examiner*—Nestor Ramirez
*Assistant Examiner*—Dang Dinh Le
(74) *Attorney, Agent, or Firm*—Leydig, Voit & Mayer, Ltd.

(57) ABSTRACT

An eccentric rotor including a printed wiring commutator device where a hole for shaft installation is formed at the center thereof and a plurality of segment patterns are formed at the periphery of one surface thereof, a winding type armature coil integrally formed in a non-mold manner so as to be eccentric toward the other surface of the printed wiring commutator device, an end connection portion installed at such a position at the outer circumferential portion of the printed wiring commutator device that latching an end portion of the winding type armature coil is possible within a range of not deviating from the turning circumference during rotation and simultaneously electrical connection with the segment patterns is possible, and also at the position of not overlapping the winding type armature coil viewed from a plane, a resin bearing holder inserted in the shaft installation hole so that part thereof protrudes toward the segment pattern and simultaneously the other part thereof is extended toward the other surface of the printed wiring commutator device, and a resin eccentric weight exhibiting density of over 3 installed at the printed wiring commutator device. Thus, connection between each end of the armature coil and the commutator in an built-in type non-mold eccentric rotor is made easy and contact of the eccentric rotor becomes simplified.

8 Claims, 21 Drawing Sheets

FIG. 4
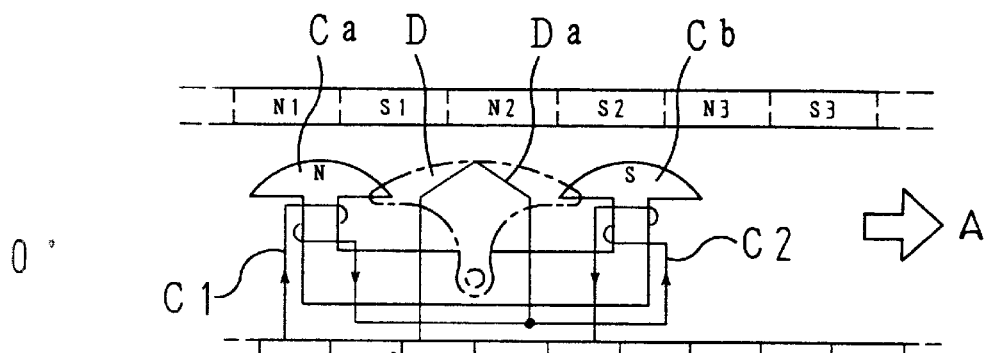
0°
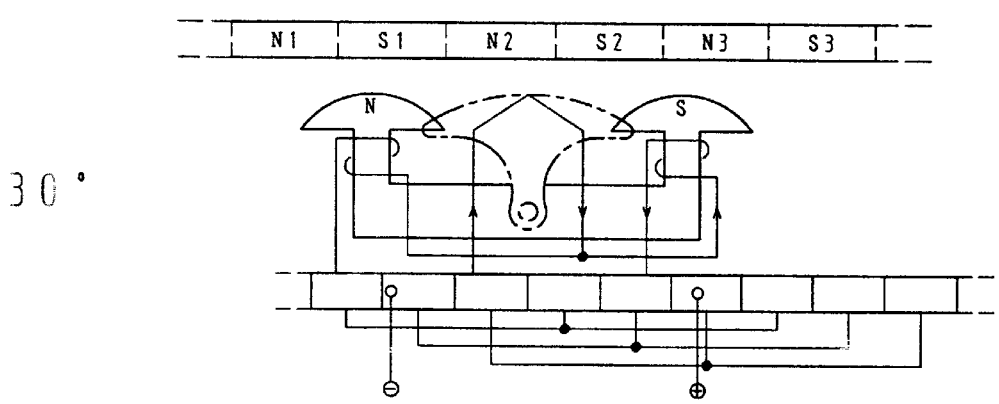
30°
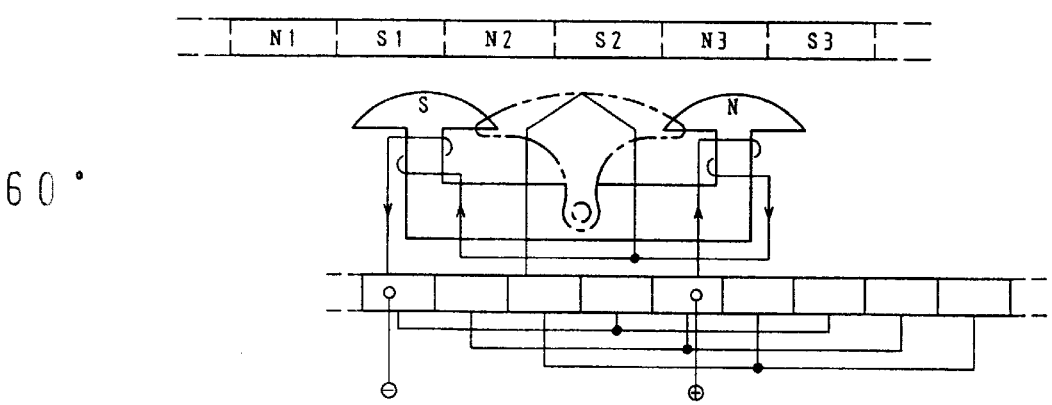
60°

1. 11. 111

F I G. 1 7
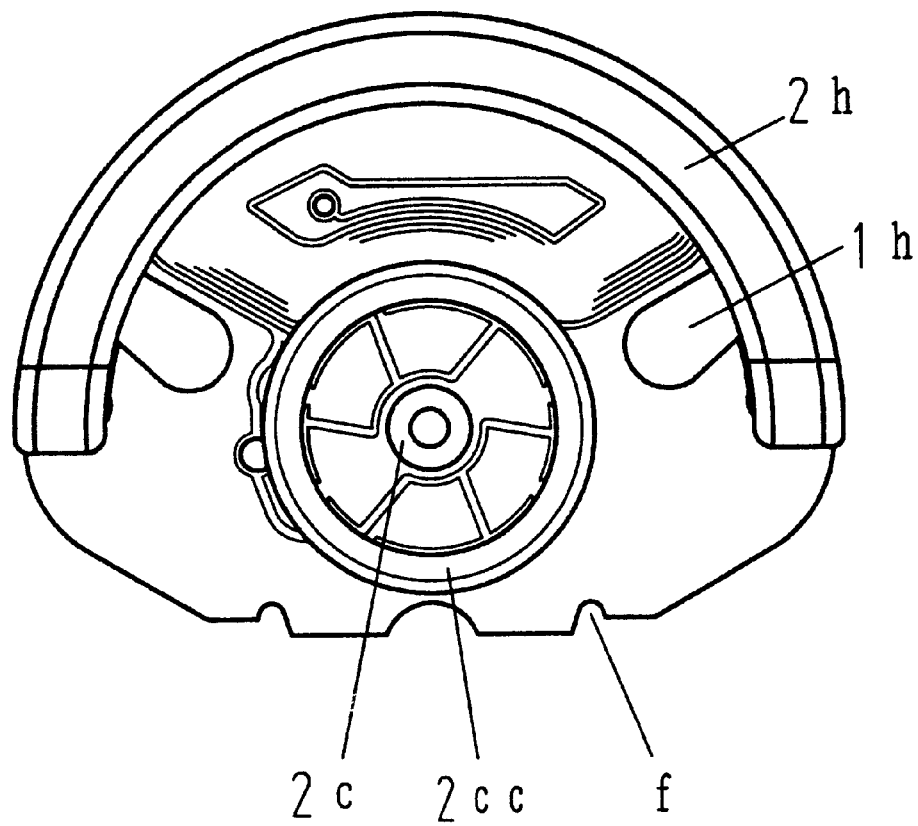

ECCENTRIC ROTOR FOR A COMPACT VIBRATOR MOTOR AND THE COMPACT VIBRATOR MOTOR INCORPORATING THE ECCENTRIC ROTOR

BACKGROUND OF THE INVENTION

1. Field of the Invention

The present invention relates to an eccentric rotor used as a silent call device for a mobile communications apparatus, a compact vibrator motor having the rotor and a method of manufacturing the rotor, and more particularly, to an improvement of assembly and structure of an eccentric rotor which does not require an eccentric weight.

2. Description of the Related Art

Referring to FIG. 21, as a silent call device for a pager or a mobile phone, an eccentric weight W made of tungsten alloy is coupled to an output shaft S of a cylindrical DC motor M. When the motor M rotates, vibrations are generated due to the difference in centrifugal force of the eccentric weight W.

However, as the above addition of the eccentric weight W to the output shaft S requires a space for rotation of the eccentric weight W in an apparatus such as a pager, there is a limit in designing the apparatus. Also, use of the expensive tungsten alloy increases the production costs.

The present applicant have suggested a cylindrical coreless vibrator motor in Japanese Patent Application No. Hei 2-309070 and the corresponding U.S. Pat. No. 5,107,155, in which a built-in rotor itself is made eccentric excluding an output shaft. The above motor having no output shaft and no eccentric weight is favorably noticed by the market as there is no limit in design, use thereof is easy and there is no danger during rotation. However, as the motor requires three cylindrical coreless coils, the number of parts or processing steps increases, thus increasing the production costs.

In order to make a rotor with a core itself vibrate instead of the cylindrical coreless coil type, the present applicant has suggested removing one of three salient pole type cores as shown in FIG. 4 of Japanese Patent Publication No. Hei 6-81443. The above two salient pole type cores where one pole in three phases is missing are preferable in the case of a motor such as a massager needing a relatively large amount of output. However, for a portable apparatus such as a portable terminal using a low voltage, as the portable apparatus is small, movement of the center of mass is little and the amount of vibrations is insufficient.

Also, as disclosed in U.S. Pat. No. 5,341,057, the present applicant has suggested a compact vibrator motor having an eccentric armature iron core which is formed by arranging three salient poles made of magnetized material at one angular side with respect to a rotor to face a field magnet having four alternate north and south pole sections. Also, the same technical concept has been disclosed in Japanese Laid-open Patent Application No. 9-261918. However, as the three armature iron cores made of magnetized material are distributed at one angular side and cogging torque (a force of being absorbed by a field magnet) increases in the case of the motor, pores needs to be enlarged and the diameter of the motor itself cannot be reduced.

The above motor having a built-in type eccentric rotor becomes a shaft-fixed type as it does not need an output shaft. As the size of the above motor is reduced, the distance between armature coils decreases. Thus, connection of the end portion thereof to the commutator without damage to the armature coil is very difficult. Particularly, when a printed circuit board is used as a flat panel commutator as it is, where the end portion of the armature coil is directly welded thereon, welding of the end portion is not easy as the end portion is easily detached from a printed pattern due to elasticity of the end portion.

SUMMARY OF THE INVENTION

To solve the above problems, it is the first objective of the present invention to provide a structure of a built-in type non-mold eccentric rotor to obtain vibrations with only an eccentric rotor in which each end portion of an armature coil can be easily connected to a commutator.

It is the second objective of the present invention to provide the structure in which the armature coil can be easily fixed although arranged to be inclined.

It is the third objective of the present invention to provide an eccentric rotor having a resin bearing portion, without using a sintered oil-storing bearing, which has advantages in that a mechanical noise can be reduced, the number of parts can be reduced as the commutator functions as a bearing, and the production costs can be saved.

It is the fourth objective of the present invention to secure a sufficient maintenance intensity using a printed wiring commutator device in arranging a guide for determining the position of a resin holder having a bearing portion and and air-core coil when a non-molding type flat rotor is configured to solve the problems of the conventional mold type.

It is the fifth objective of the present invention to provide an eccentric rotor in which the nature of sliding and the amount of eccentricity coexist.

It is the sixth objective of the present invention to solve the problems of the conventional mold type or loss of properties, without sacrifice of the thickness, by is forming a printed wiring coil at the eccentric printed wiring commutator device constituting a non-mold type flat rotor.

It is the seventh objective of the present invention to provide a low-postured eccentric rotor, that is, a thin vibrator motor.

It is the eighth objective of the present invention to provide a method of manufacturing a non-mold type flat rotor which can be subject to mass production due to the property of a printed wiring commutator device.

Accordingly, to achieve the above objects, there is provided an eccentric rotor which includes a printed wiring commutator device where a hole for shaft installation is formed at the center thereof and a plurality of segment patterns are formed at the periphery of one surface thereof, a winding type armature coil integrally formed in a non-mold manner so as to be eccentric toward the other surface of the printed wiring commutator device, an end connection portion installed at such a position at the outer circumferential portion of the printed wiring commutator device that latching an end portion of the winding type armature coil is possible within a range of not deviating from the turning circumference during rotation and simultaneously electrical connection with the segment patterns is possible, and also at the position of not overlapping the winding type armature coil viewed from a plane, a resin bearing holder inserted in the shaft installation hole so that part thereof protrudes toward the segment pattern and simultaneously the other part thereof is extended toward the other surface of the printed wiring commutator device, and a resin eccentric weight exhibiting density of over 3 installed at the printed wiring commutator device.

It is preferred in the present invention that the resin bearing holder exhibits a feature of sliding of a mobile friction coefficient equal to or less than 0.4 (1.5 kg/cm$^2$) and is installed in a bearing hole located at the center to be capable of directly rotating to the shaft.

It is preferred in the present invention that a compact vibrator motor includes a printed wiring commutator device where a hole for shaft installation is formed at the center thereof and a plurality of segment patterns are formed at the periphery of one surface thereof, a winding type armature coil configured in a non-mold manner by being wound around two magnetized salient poles, which become a winding type armature coil position determination guide, facing each other and by making an open angle of wiring of a blade receiving magnetic flux of a field magnet eccentric, at the other surface of the printed wiring commutator device, an eccentric rotor having an eccentricity accentuating non-magnetized salient pole simultaneously used as a resin holder and an eccentric weight made of sliding, high density resin exhibiting density of equal to or more than 3 and a mobile friction coefficient of equal to or less than 0.4 (1.5 kg/cm$^2$), and arranged such that the thickness thereof is within a thickness in the axial direction of the winding type armature coil, by being inserted in the shaft installation hole, to maintain the magnetized salient poles, between two magnetized salient poles, a shaft supporting the eccentric rotor to be capable of rotating, and a housing accommodating the eccentric rotor and a magnet for applying magnetic force to the eccentric rotor.

It is preferred in the present invention that the compact vibrator motor further comprises an eccentric rotor configured by winding a third armature coil around the non-magnetic salient pole.

To achieve the above objects, there is provided an eccentric rotor including a printed wiring commutator device formed to be eccentrically as an expanded fan viewed from a plane, in which a hold for shaft installation is formed at the center thereof and a plurality of segment patterns are formed at the periphery of one surface thereof, a winding type air-core armature coil incorporated in an air-core armature coil position determination guide in a non-mold manner, which protrudes and is formed to be eccentric at the other surface of the printed wiring commutator device, an end connection portion installed at such a position at the outer circumferential portion of the printed wiring commutator device that latching an end portion of the winding type armature coil is possible within a range of not deviating from the turning circumference during rotation and simultaneously electrical connection with the segment patterns is possible, and also at the position of not overlapping the winding type armature coil viewed from a plane, a resin bearing holder inserted in the shaft installation hole so that part thereof protrudes toward the segment pattern and simultaneously the other part thereof is extended toward the other surface of the printed wiring commutator device, and a resin eccentric weight exhibiting density of over 3 installed at a fan-like arc-shaped portion of the printed wiring commutator device.

It is preferred in the present invention that the air-core armature coil position determination guide and the eccentric weight are connected by a resin passing portion installed at the printed wiring commutator device for reinforcement.

It is preferred in the present invention that the resin bearing holder, the air-core coil position determination guide and the arc-shaped eccentric weight are connected together by the same resin.

It is preferred in the present invention that, in forming conductive bodies electrically connecting predetermined segment patterns of the printed wiring commutator device through through holes, the through holes being used as a resin passing portion when the resin bearing holder is formed integrally.

To achieve the above objects, there is provided a compact vibrator motor including an eccentric rotor; a shaft supporting the eccentric rotor to be capable of rotating; and a housing accommodating the eccentric rotor and a magnet for applying a magnetic force to the eccentric rotor.

It is preferred in the present invention that an eccentric rotor includes an eccentric printed wiring commutator device formed as an expanded fan viewed from a plane, in which a hole for shaft installation is formed at the center thereof, a plurality of segment pieces are exposed toward the periphery of one surface thereof, at least one armature coil is formed in a printed wiring manner at at least one surface, a winding type armature coil installation guide is eccentrically incorporated, and an end connection portion for each coil is arranged in the turning outer circumference during rotation, a winding type air-core coil incorporated in the air-core position determination guide in a non-mold manner and the end portion is connected to the end connection portion, a resin bearing holder inserted in the shaft installation hole so that part thereof protrudes toward the segment pattern and simultaneously the other part thereof is extended toward the other surface of the printed wiring commutator device, and a resin eccentric weight exhibiting density of over 3 installed at a fan-like arc-shaped portion of the printed wiring commutator device.

It is preferred in the present invention that a printed wiring commutator device is provided in which an armature coil formed by the printed wiring is formed at both surfaces, the device functioning as one coil through a through hole.

It is preferred in the present invention that, in forming conductive bodies electrically connecting predetermined segment patterns of the printed wiring commutator device through the through holes the through holes being used as resin passing portion when the resin bearing holder is formed integrally.

It is preferred in the present invention that resin holder, air-core coil position determination resin guide and eccentric weight are integrally formed at the printed wiring commutator device using the same sliding resin exhibiting density of equal to or more than 3 and a mobile friction coefficient of equal to or less than 0.4 (1.5 kg/cm$^2$).

To achieve the above objects, there is provided a method of manufacturing an eccentric rotor which includes the steps of (a) forming a hold for shaft installation at the center thereof and at least a plurality of segment patterns at the periphery of one surface thereof, installing an end connection portion at the outer circumference thereof, and installing a plurality of printed wiring commutator devices where a resin passing portion is formed through a connection portion arranged at the outer circumference thereof, (b) integrally forming a resin bearing holder with resin exhibiting a sliding property and a mobile friction coefficient of equal to or less than 0.4 (1.5 kg/cm$^2$) by setting the printed wiring commutator device to an injection mold, (c) integrally installing a winding type armature coil to be eccentric by separating from each connection portion or as it is, in a non-mold manner, and (d) configuring an eccentric rotor by connecting an end portion of the winding type armature coil to the end connection portion.

It is preferred in the present invention that, when the resin bearing holder is integrally molded in the step (b), the air-core coil position determination guide and the eccentric weight are formed concurrently, that the method further includes a step of injection-molding at least an eccentric weight portion with resin exhibiting density over 3, after the step (b), and that, as a means for installing a winding type armature coil of the step (c), the air-core armature coil determination guide is heated and extended.

BRIEF DESCRIPTION OF THE DRAWINGS

The above objectives and advantage of the present invention will become more apparent by describing in detail preferred embodiments thereof with reference to the attached drawings in which:

FIG. 4 is a view for explaining the principle of operation of the above motor;

FIGS. 8(A) and 8(B) are cross sectional view showing another modified example of the motor according to the second preferred embodiment of the present invention, in which FIG 8(A) is a cross sectional view viewed from the opposite side of a commutator and FIG. 8(B) is a cross sectional view viewed from the commutator's side;

FIG. 17 is a cross sectional view of the eccentric rotor integrated with a resin holder and made to a non-mold type flat rotor, viewed from the opposite side of the segment;

DETAILED DESCRIPTION OF THE INVENTION

Figure 1:
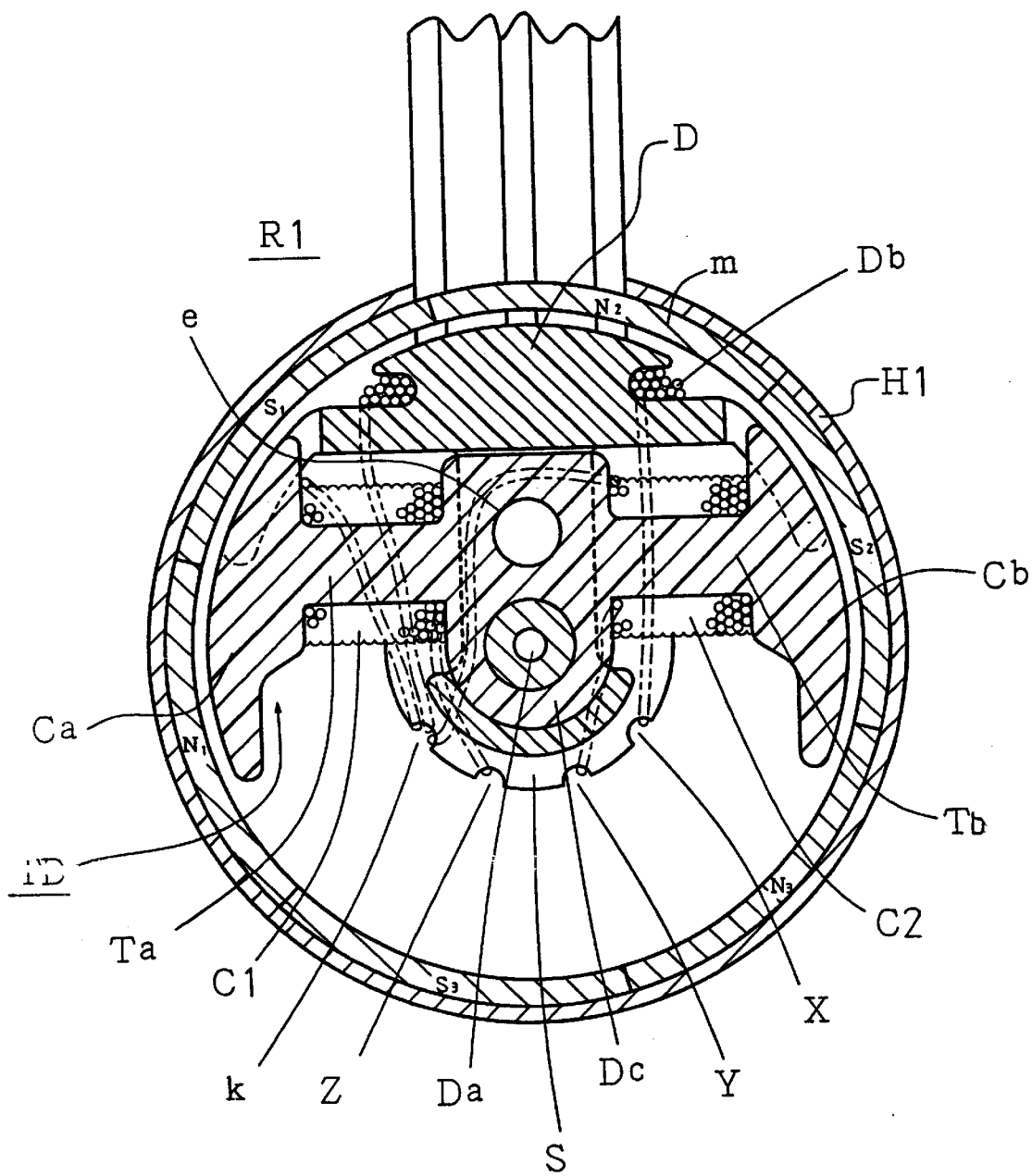
FIG. 1 is a cross sectional view showing a compact vibrator motor having an eccentric rotor according to the first preferred embodiment of the present invention.
Figure 2:
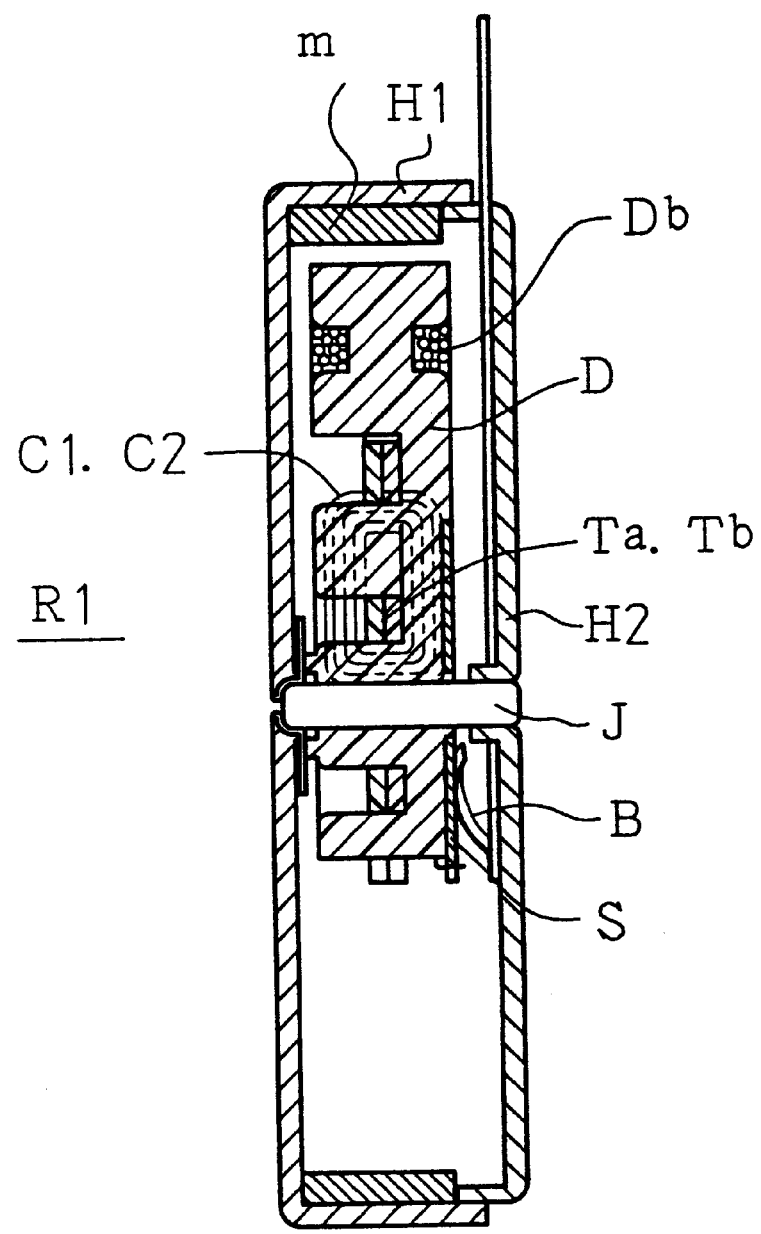
FIG. 2 is a vertical sectional view of the motor of FIG. 1.

In FIGS. 1 and 2, letter m denotes a ring type field magnet made of rare-earth plastic material consist of N/S alternating magnetized 6 pole sections. H1 denotes a casing made of a tin-plated steel plate which maintains the field magnet m and concurrently provides a path for magnetic field. Letter C denotes an eccentric core made of two sheets of silicon steel plates. Two blades Ca and Cb disposed to face each other while forming an open angle are slightly larger than the field poles and simultaneously the overall open angle of the two blades Ca and Cb, viewed from a plane, is formed to be within four poles+N(N is non-magnetized portion) of the magnet m. Also, two salient poles Ta and Tb (coil portions) incorporated in the blades Ca and Cb are eccentric so as to not be in a radial direction from the center of the core C, to be off the center of each blade, and to be at an eccentric position with respect to the center of the core C, so that an armature coil described later can be easily wound. The armature coils C1 and C2 are wound around the outer circumference of the magnetic salient pole of the eccentric core via a coating layer (not shown), and the end connecting portion is connected to the outer circumference of the opposite weight center of the commutator so as to not overlap a commutator made of a printed wiring commutator device, described later, when viewed from a plane.

An eccentric armature core TD is configured by a non-magnetized salient pole D situated between two salient poles Ta and Tb. The non-magnetized salient pole D for accentuation of eccentricity is made of a high sliding; i.e., low friction, resin of density (specific gravity) over 5 to simultaneously function as a bearing. A bearing hole Da is formed in the center of the non-magnetized salient pole Dc. The commutator S made of the printed wiring commutator device is inserted in and incorporated in a hole Sa for shaft installation disposed at the center thereof around the bearing hole Da opposite at the center of the non-magnetized salient pole D. The commutator S has 9 sectioned segments Sa, Sb, Sc, Sd, Se, Sf, Sg, Sh and Si, described later, of which a sliding surface is plated with a noble metal. Concave portions x, y, z and k for supporting an armature coil end connecting portion made of a half through hole (having the outer circumference thereof notched), at the segment disposed at the opposite central side. In this case, the concave portion k as a common electrode is independent of all segments.

Thus, the end connecting portion is situated within a pivot space.

The non-magnetized salient pole D also used as the bearing determines the position to be coupled by a guide hole e formed in the eccentric core C. Also, as the high sliding resin of density (specific gravity) over 3, resin of specific gravity 3 through 7 is selected considering balance between properties of high specific gravity and high sliding.

In the eccentric armature core TD, an air-core armature coil Db is wound around the blade of the non-magnetized salient pole D and this portion is of a coreless type.

Each initial end portion of the armature coils C1 and C2 and the air-core armature coil Db is preliminary welded so that the initial end portion is hooked by the respective concave portions x, y and z. The terminating end portion of the coil, including the air-core armature coil Db, is hooked together by the concave portion k and connected through welding in a star-shaped connection manner. Also, the commutator S has an electrode pattern, not specifically shown here, electrically connecting every two other commutator pieces, forming an eccentric rotor R1. Thus, the end connection portion is separated from each armature coil is a plane so that welding is made easy.

The eccentric rotor R1 having the above structure is rotatably installed through the bearing hole Dc of the non-magnetized salient pole concurrently used as a bearing at a shaft J fixed to a bracket H2 constituting a housing with the casing H1. A pair of brushes B and B arranged through welding at the bracket H2 through a flexible substrate F slidingly contact the commutator S at an open angle an odd numbered of times to the field pole (here, 180 degrees) so that electric power is supplied to the armature coils C1 and C2.

Figure 3:
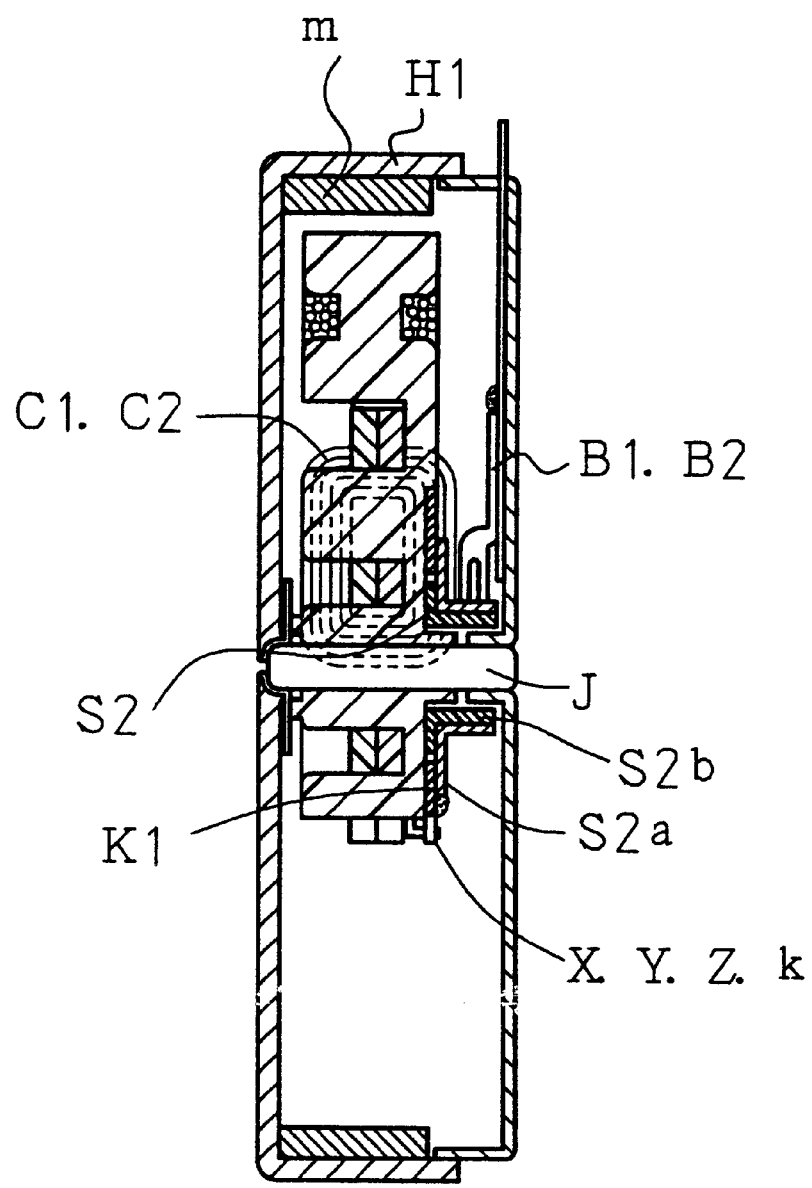
FIG. 3 is a vertical sectional view of a modified example of the motor of FIG. 1.

Also, although the commutator is described as a flat plate type formed of a substrate for a printed wiring circuit in each preferred embodiment, it is alright that a substrate K1 for printed wiring circuits which are not plated with a noble metal as a wiring of conducive bodies (not shown) which connects the commutator pieces facing as shown in FIG. 3 is integrally formed and a thin cylindrical commutator S2 is welded at each terminal S2a. In this case, the concave portions x, y, z and k are installed at the outer circumference of a substrate for a printed wiring circuit K1 which is not plated with the noble metal, as each initial end connection portion of the armature coils C1 and C2 and the air-core armature coil Db. For making a slim body, at least a part of the printed wiring circuit substrate K1 and a terminal portion (a riser portion ) S2b of the cylindrical commutator S2 is accommodated within the thickness of the non-magnetized salient pole D. Also, the brushes B1 and B2 slidingly contacting the thin cylindrical commutator S2 are installed at the bracket H2 by being bent to avoid a protrusion where the armature coil is wound about. Also, a part of a support portion H2a of the shaft J fixedly installed at the bracket H2 is inserted in the cylindrical commutator S2.

Such a structure makes it possible to form a cored motor, having a protrusion about which the armature coil is wound, that is thin. Also, instead of each concave portion, each terminal portion S2b of the cylindrical commutator S2 may protrude toward the opposite a position center.

Next, the principle of rotation according to the first preferred embodiment will now be described with reference to FIG. 4.

When a DC voltage by a power source (not shown) is applied to a pair of brushes B1 and B2, and when the eccentric rotor R1, consisting of the armature coils C1 and C2, the magnetized salient poles Ta and Tb (a coil portion) and the commutator S, is at the position of 0 degree, current flows in a direction indicated by arrows though the armature coil and the blades Ca and Cb of the salient pole are respectively magnetized by N and S poles. The blade Ca is attracted by S1 pole of the field magnet and simultaneously repels N1. Here torque in a direction indicated by arrow A is generated. When the rotation proceeds to a degree of 30°, as the blade Cb is magnetized to S pole so as to be attracted by N3 pole of the field magnet and simultaneously repelled by S2 pole, torque in the direction indicated by arrow A is generated. Here, the armature coil C1 becomes non-conductive and the north pole facing to the south pole of the blade Ca of the salient pole Ta, so as to be attracted to the S1 pole of the field magnet. Also, the air-core armature coil Db of the non-magnetized salient pole D becomes conductive, and torque in the direction indicated by arrow A is generated according to Fleming's left-hand rule. Thus, stronger rotation can be obtained. Anti-torque to hinder the rotation is not generated at the other positions. Also, when the rotation further proceeds to a degree of 60° of FIG. 4, current flows in the reverse direction, but the position of the field magnet is changed to the contrary. Thus, torque is generated in a direction indicated by arrow A for rotation. Anti-torque to hinder the rotation is not generated at the other positions.

Thus, as long as the power is supplied, the rotation continues periodically. Also, although the above description is based on the star-shaped connection type, a delta connection type can be used by changing the position of the brush.

Each preferred embodiment adopting the coreless eccentric rotor will now be described. Here, the portions having the same functions are indicated by the same reference numerals and the description thereof may be omitted.

Figure 5:
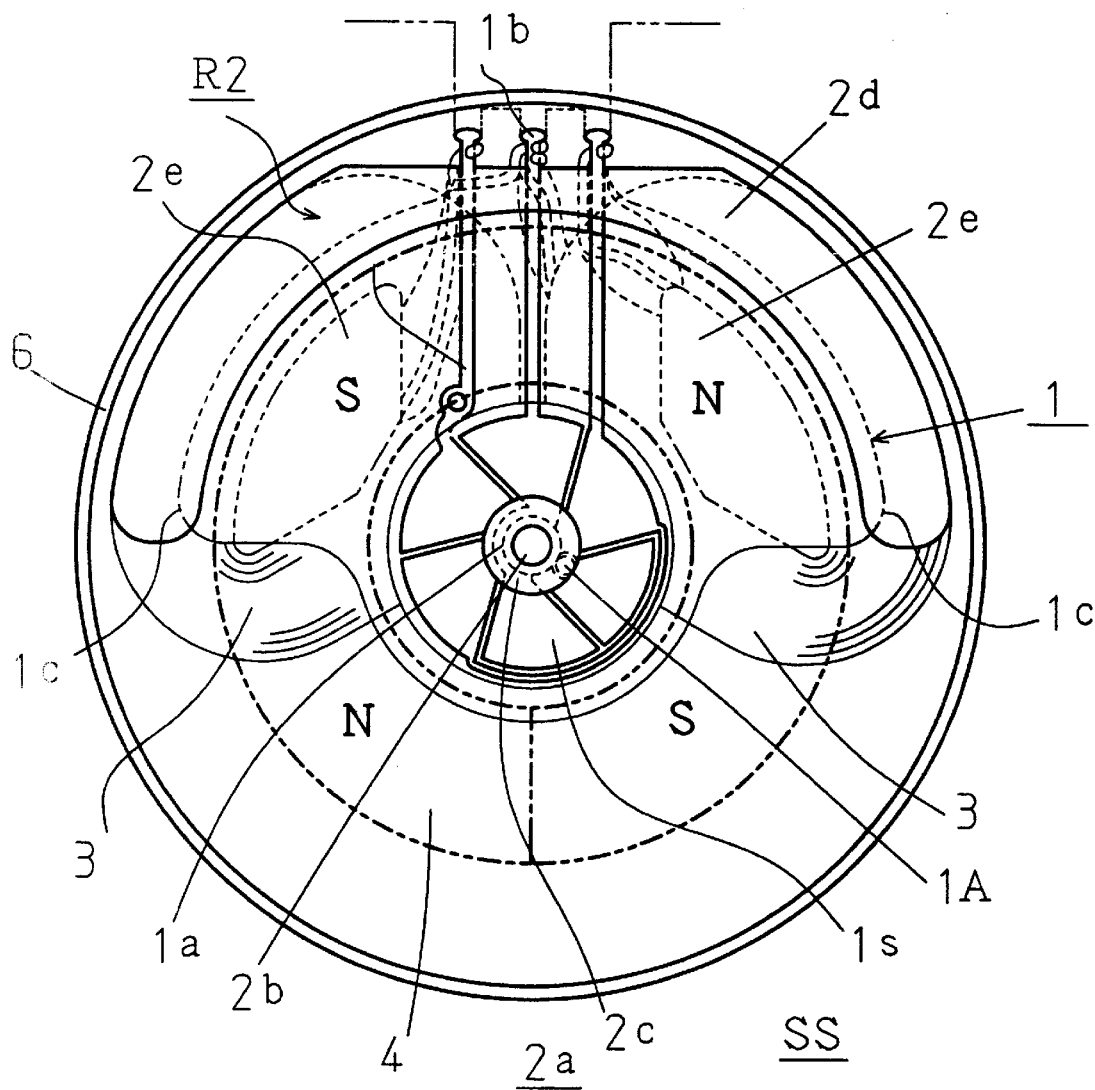
FIG. 5 is a cross sectional view showing a motor according to the second preferred embodiment of the present invention.

FIG. 5 shows a motor according to the second preferred embodiment of the present invention. Reference numeral 1 denotes an eccentric commutator device made of a printed wiring circuit substrate shaped as an expanded fan viewed from a plane and having a hole 1a for shaft installation at the center thereof. To encompass the eccentric commutator device 1, high sliding, i.e., low friction, resin 2 exhibiting high density of specific gravity 6 is integrally and thinly formed on the entire surface of the eccentric commutator device 1, like a half-circle viewed from a plane, so as to form an eccentric commutator SS. Six printed wiring segment patterns 1s having inclined slits for preventing a spark are arranged at the eccentric commutator device 1. An armature coil end connection terminal 1b, described later, protrudes from the semicircular arc shaped bottom portion of three segment patterns at the movement of the center. The eccentric commutator device 1 is installed by being extended with an reinforced portion 1c to the inside of both ends of a half-circle of which both ends are formed of high density high sliding resin 2. The segment patterns 1s electrically connect each segment patten facing each other according to the rotation using the inside surface through a pattern on the surface and a through hole 1A. A resin bearing holder 2a ascends from the high density high sliding resin 2 toward the opposite segment pattern in the shaft installation hole 1a at the center of the eccentric commutator device 1. A bearing hole 2b is formed at the center of the eccentric commutator device 1 and is maintained at the eccentric commutator device 1 by a dam portion 2c protruding toward the segment pattern from the high density high sliding resin 2.

In the eccentric commutator device 1 having the above structure, an arc shaped portion 2d which becomes a portion of an eccentric weight for center movement is installed at the semicircular outer circumferential portion. Air-core armature coil position determination fixing guides 2e, described later, are integrally formed with the high density high sliding resin 2, as indicated by a dotted line, at the inside surface of each of the six segment patterns 1s at an arranged open angle of 120°. The air-core armature coils 3 and 3 made of a winding around a self-fusing line are inserted in the air-core armature coil position determination fixing guides 2e and the beginning and termination end portions of the winding are wound around the armature coil end connection terminal 1b, and dipping-welded thereto, through a predetermined groove so as to not come out from the thickness of the rotor, thus forming an eccentric rotor R2. A magnet 4 for driving the rotor is magnetized to have four alternating N/S poles.

Also, the principle of operation in which one phase is open in the above three phase armature coil will be omitted as it is a well-known technology.

Figure 6:
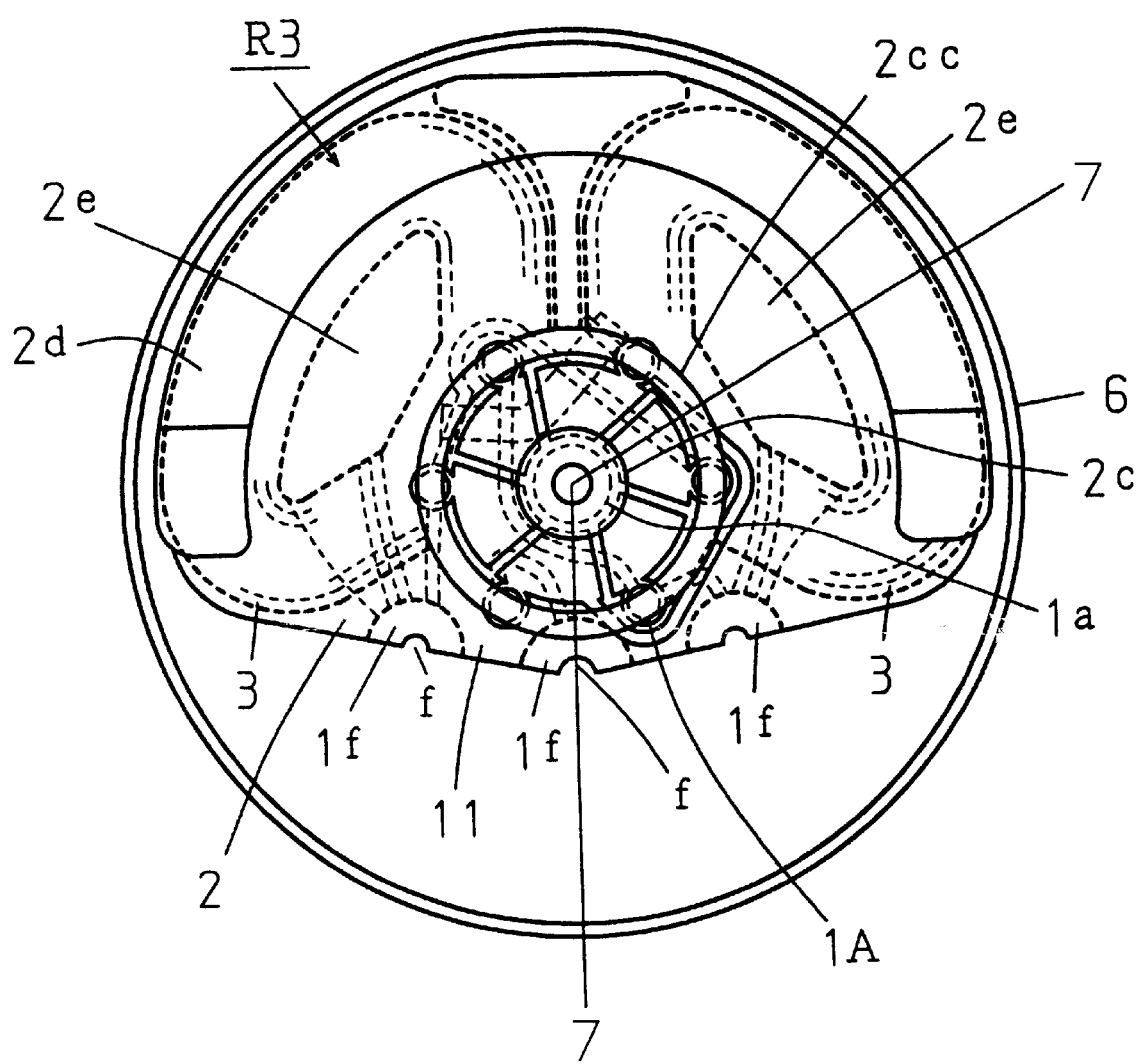
FIG. 6 is a cross section view showing a modified example of the motor accord n to the second preferred embodiment of the present invention.
Figure 7:
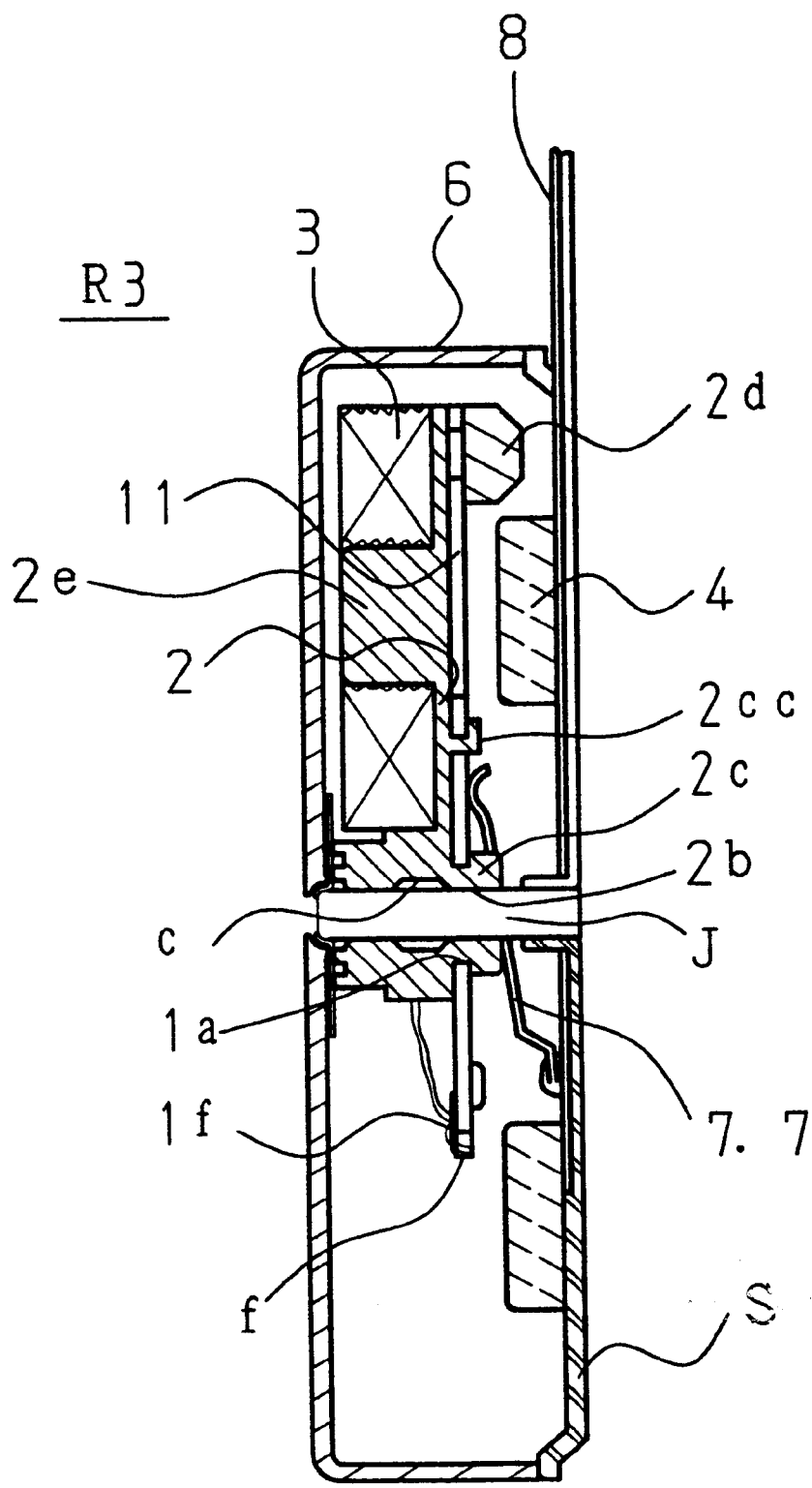
FIG. 7 is vertical sectional view taken along line 7—7 of FIG. 6.

FIG. 6 shows a cross sectional surface of the vibrator motor using a modified eccentric rotor of FIG. 5; and FIG. 7 shows a vertical sectional surface of the vibrator motor shown in FIG. 6. The eccentric commutator device 11 is formed to be slightly greater than a half-circle viewed from a plane and the armature coil end connection terminal 1f is installed at the opposite position of the center, unlike the above embodiment.

A notch f for hooking is formed at each of the armature coil end connection terminal 1f. The armature coil end connection terminal 1f is disposed to not overlap the air-core armature coils 3, viewed from a plane, so that the connection of the end portion is made easy.

In the shaft installation hole 1a at the center of the eccentric commutator device 11, a resin bearing holder 2a lifted from the semicircular high density high sliding resin 2 is installed by being extended toward the opposite position of the segment pattern, and a bearing hole 2b is formed at the center thereof. A dam portion 2c formed of the high density high sliding resin 2 protrudes toward the segment pattern. The second dam portion 2cc for reinforcement is installed toward the segment pattern at the part of the resin bearing holder 2a via the through hole 1A. Each of the dam portions 2c and 2cc is molded to prevent the resin from flowing into each slit of the segment 1s.

The air-core armature coils 3 and 3 made of a winding around a self-fusing line are inserted in the air-core armature coil position determination fixing guides 2e and the beginning and termination end portions of the winding are welded to the armature coil end connection terminal 1f, so as to not come out from the thickness of the rotor, thus forming an eccentric rotor R3. Preferably, as a fixing device for the air-core armature coil 3, the air-core armature coil position determination fixing guides 2e are deformed by heating and fused, or are fixed by a reflow of powder or solid epoxy.

The motor including the eccentric rotor R3 is an axial direction pore type and driven by a flat magnet 4. Reference numeral 5 denotes a bracket made of a tin-plated steel plate for maintaining the magnet 4 and concurrently providing a magnetic path. The bracket 5 forms a housing with a case 6. A shaft J fixed at the center of the bracket 5 is rotatably installed through the bearing hole 2b of the resin bearing holder 2a. A pair of brushes 7 and 7 disposed at the bracket 5 sliding-contact the segment pattern at an open angle of 90° so that power is supplied to the armature coils 3 and 3 from the outside via a flexible substrate 8.

Figure 8A:
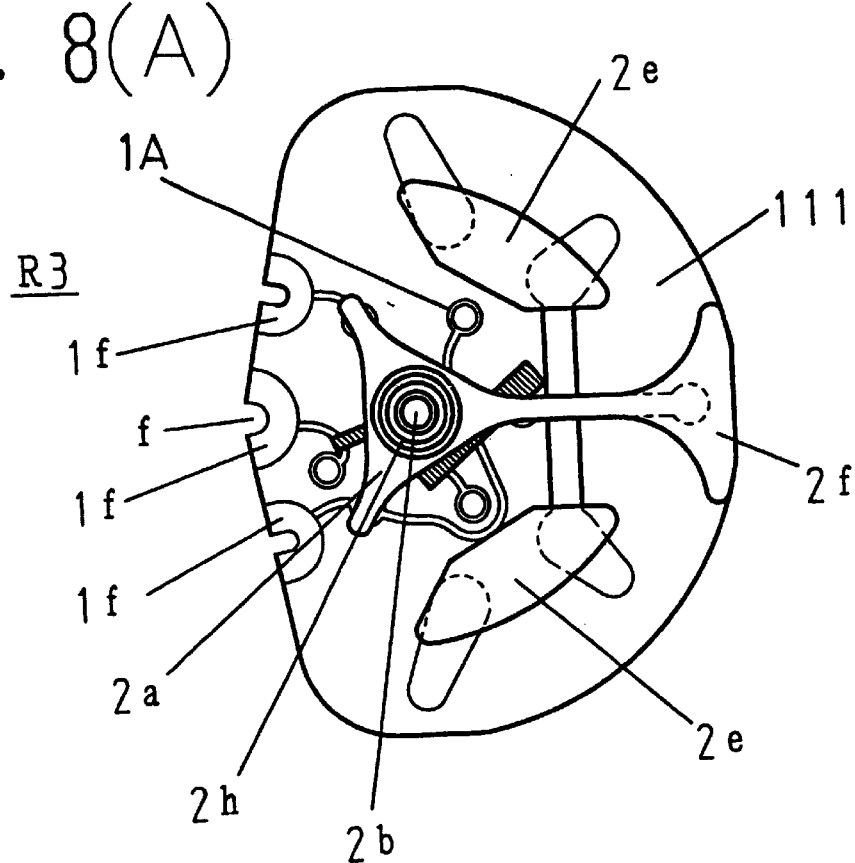
Figure 8B:
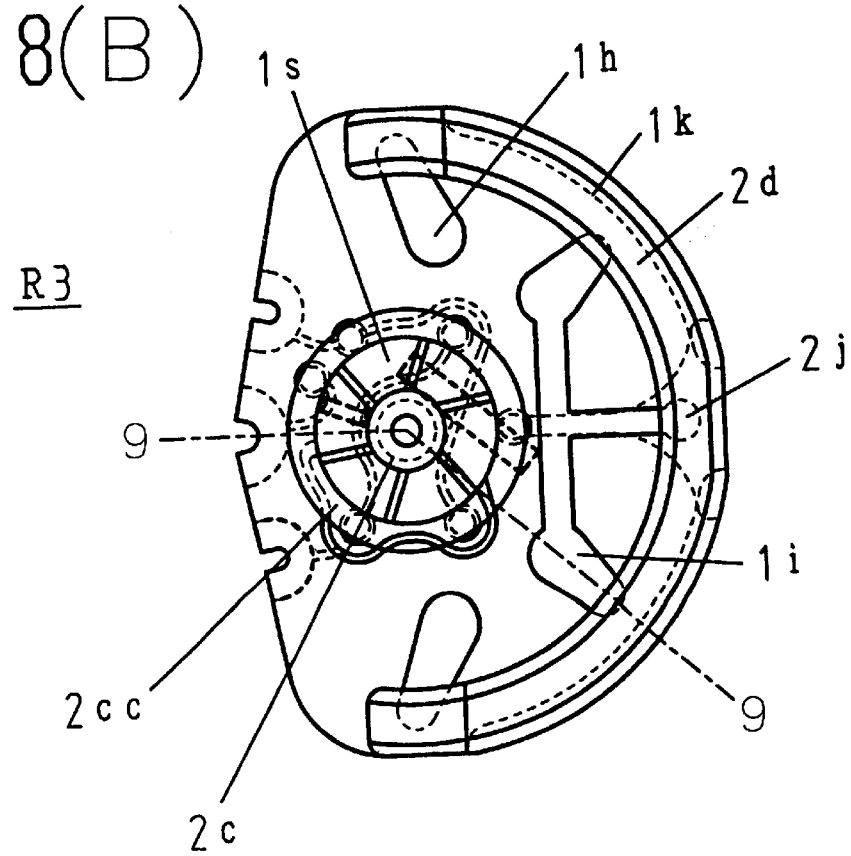

FIGS. 8(A) and 8(B) show a modified shape of the second preferred embodiment shown in FIG. 6, in which FIG. 8(B) is a cross sectional view viewed from the opposite side of the commutator and (Y) is a cross sectional view viewed from the side of the commutator. That is, reference numeral 111 denotes a printed wiring commutator device formed to be an expanded fan, viewed from a plane, and six segments 1s, of which surfaces are plated with the noble metal and having inclined slits, are arranged on one side thereof for spark prevention. Conductive bodies which electrically connect the segments facing each other among the above segments are formed at an inner surface via the through hole 1B. Reference numerals 1h, 1i, 1j and 1k denote a resin passing portion which is one of the features of the present invention. The resin passing portion is reinforced when a resin holder, an air-core coil position determination guide, an eccentric weight, which will be described later, are integrally formed with the printed wiring commutator device 11. The resin passing portions 1h and 1i are installed at the air-core coil position determination guide, the resin passing portions 1j and 1k formed by notching a part of the outer circumference are installed at the eccentric weight, and the through hole 1B is installed at the resin bearing holder 2a.

A sliding portion 2h where the bearing hole 2b and an oil storing groove rotatably installed at a shaft which will be described later are coaxially installed is arranged at the resin bearing holder 2a, and passes through the through hole 1A by leg portions which are well arranged to be balanced. The second dam portion 2cc at the surface and the first dam portion 2c at the central portion are reinforced by being coated with resin.

Part 2f of the eccentric weight lifts the other part 2d of the arc-shaped eccentric weight toward the segment through the resin passing portion 1j. Both ends of the other part 2d of the eccentric weight are tapered to prevent loss of wind during rotation.

Figure 9:
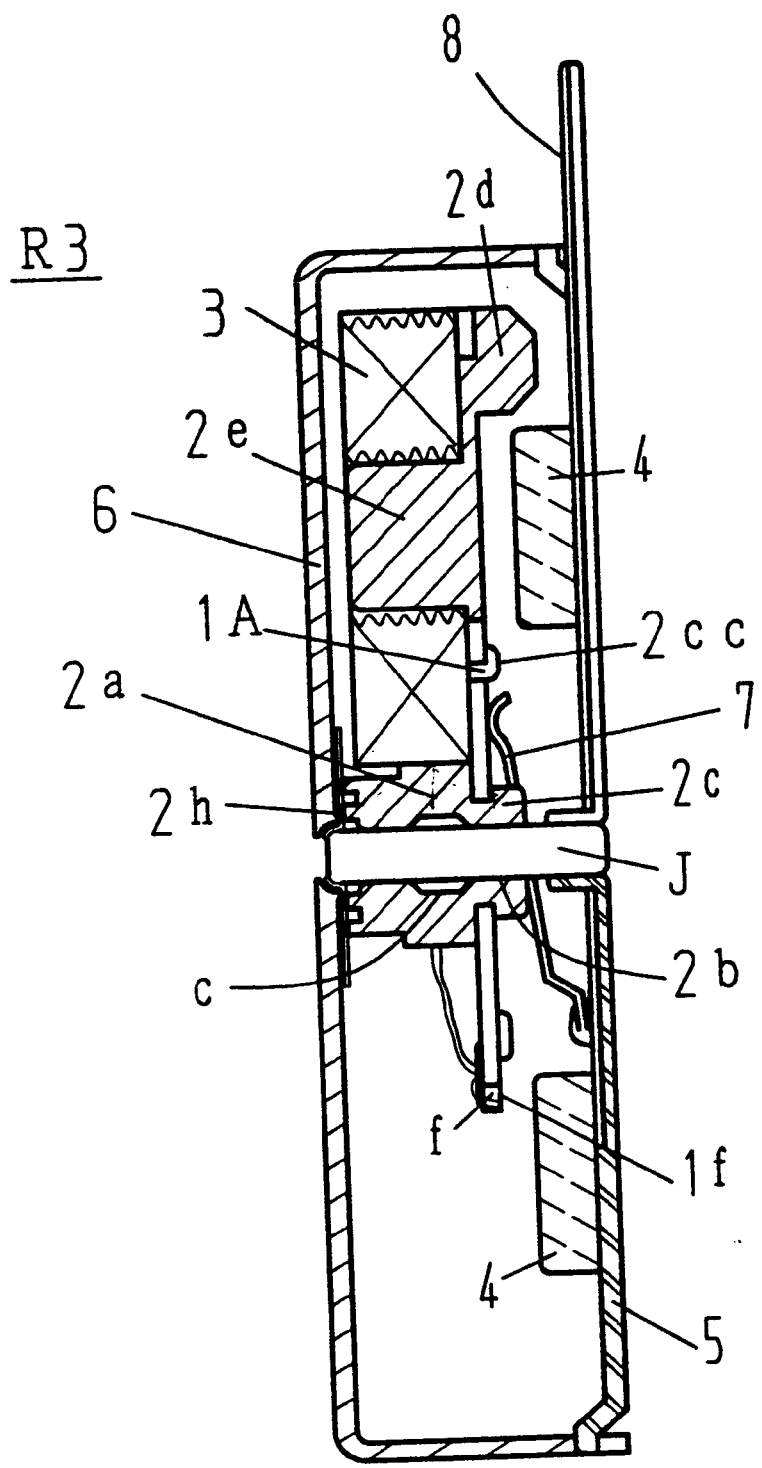
FIG. 9 is a vertical sectional view taken along line 9—9 of FIG. 8.

Next, FIG. 9 shows a flat coreless vibrator motor using the eccentric rotor R4. As the bearing hole 2b has a recess c of a few microns formed inside, loss of bearing is reduced. In a means for forming the recess c, a middle portion of the resin holder 2a is thicker than other portions as shown in the drawing so that a recess can be easily formed using the difference in percentage of contraction of resin. Also, the few-micron recess can be fabricated by excessive drawing with a mold pin.

As the resin bearing holder, the air-core coil position determination guide, and the eccentric weight can be formed together with the single resin injection molding according to the above method, the structure is simplified and the cost is lowered. Also, as the air-core coils 3 and 3 can be directly installed at the printed wiring commutator device 11, pore can be made small and efficiency is increased.

Figure 10:
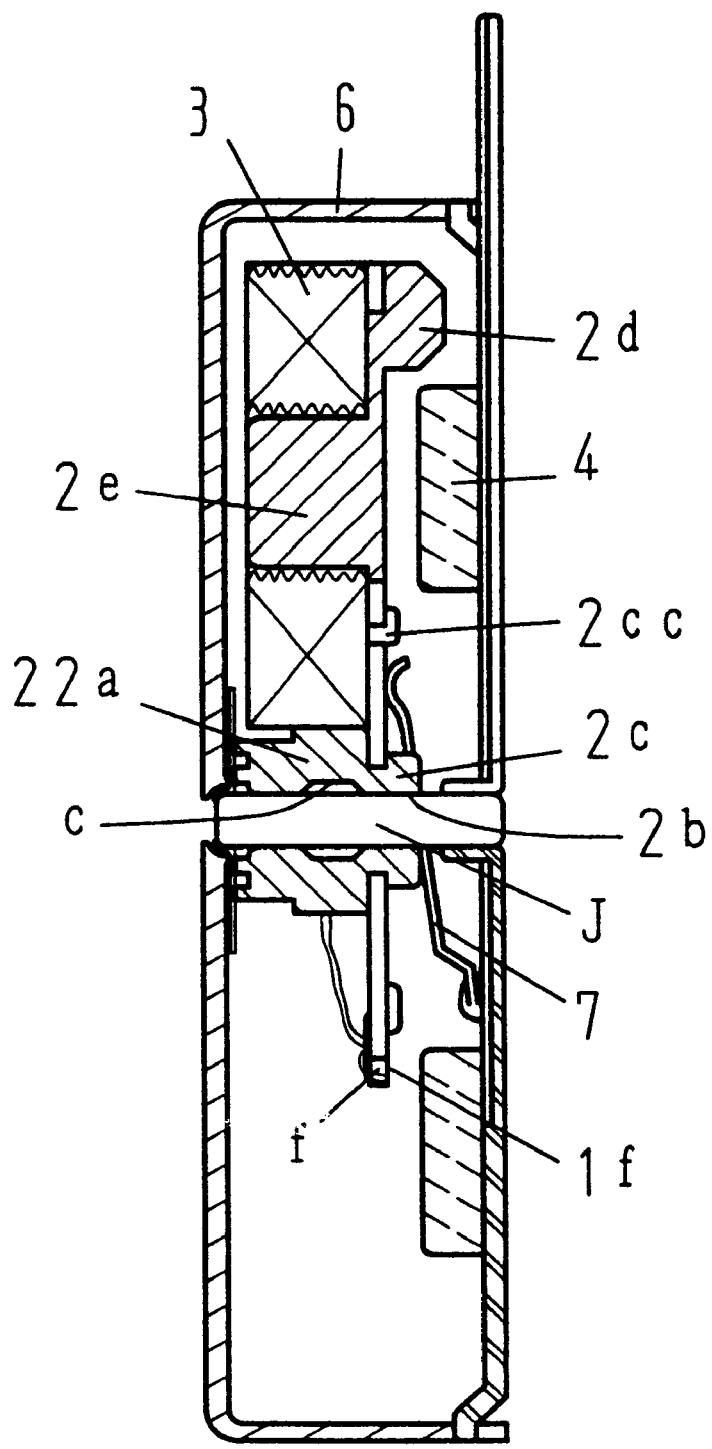
FIG. 10 is a vertical sectional view of a modified example of the motor shown in FIG. 9.
Figure 11:
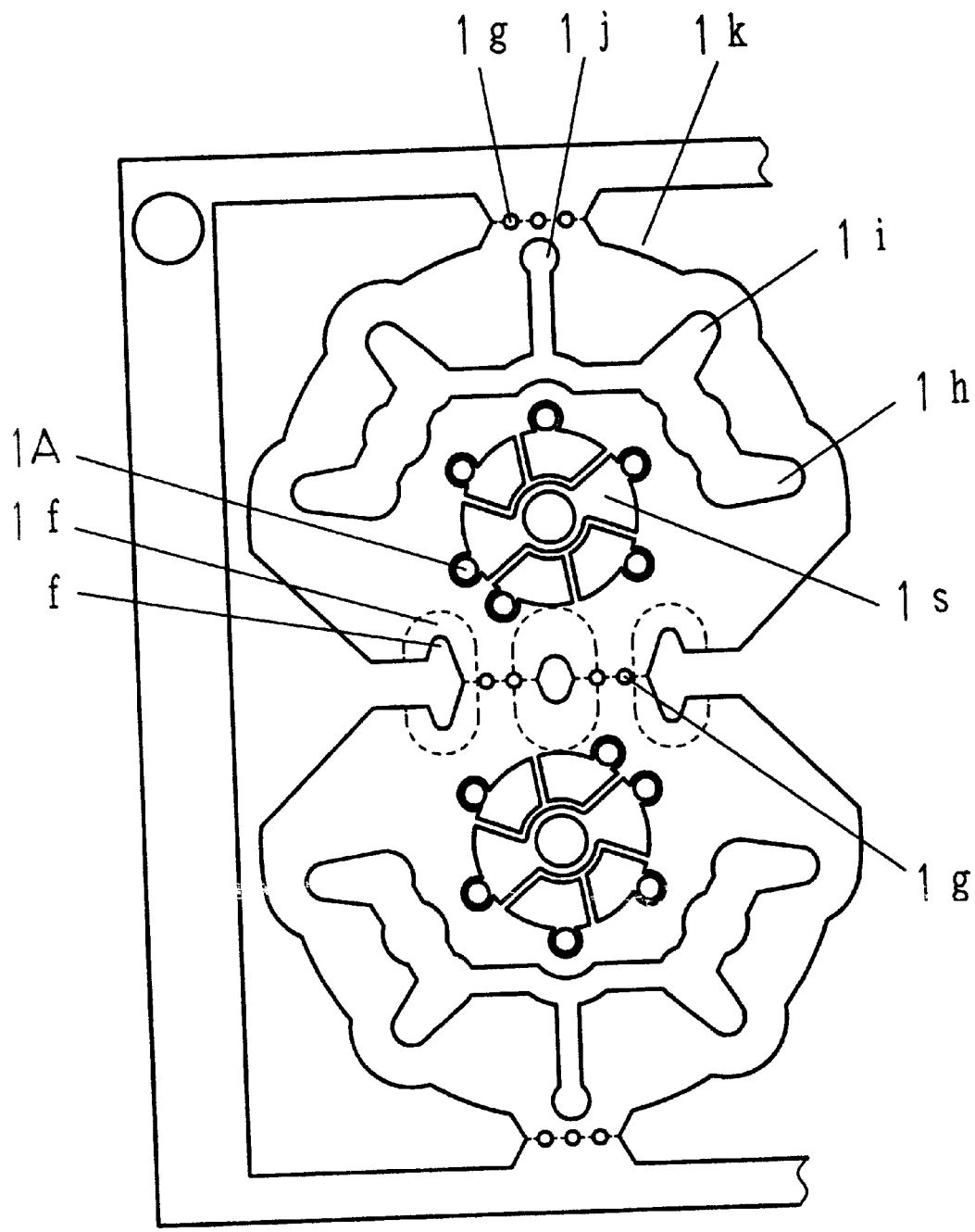
FIGS. 11, 12, 13 and 14 are plan views showing a method of manufacturing major members of the eccentric motor according to the present invention.

Also, as shown in FIG. 10, it is possible that the resin bearing holder 22a is formed of low density sliding resin and then the air-core coil position determination guides 2e and the eccentric weight portions 2f and 2n are molded with a high density resin.

FIGS. 11, 12, 13 and 14 shows a basic method of manufacturing an eccentric rotor having the above eccentric printed wiring commutator device. That is, eccentric printed wiring commutator devices 1, 11 and 111 are plurally and integrally connected by the connection portions 1g at the same pitch for mass production and are manufactured through press work.

Figure 12:
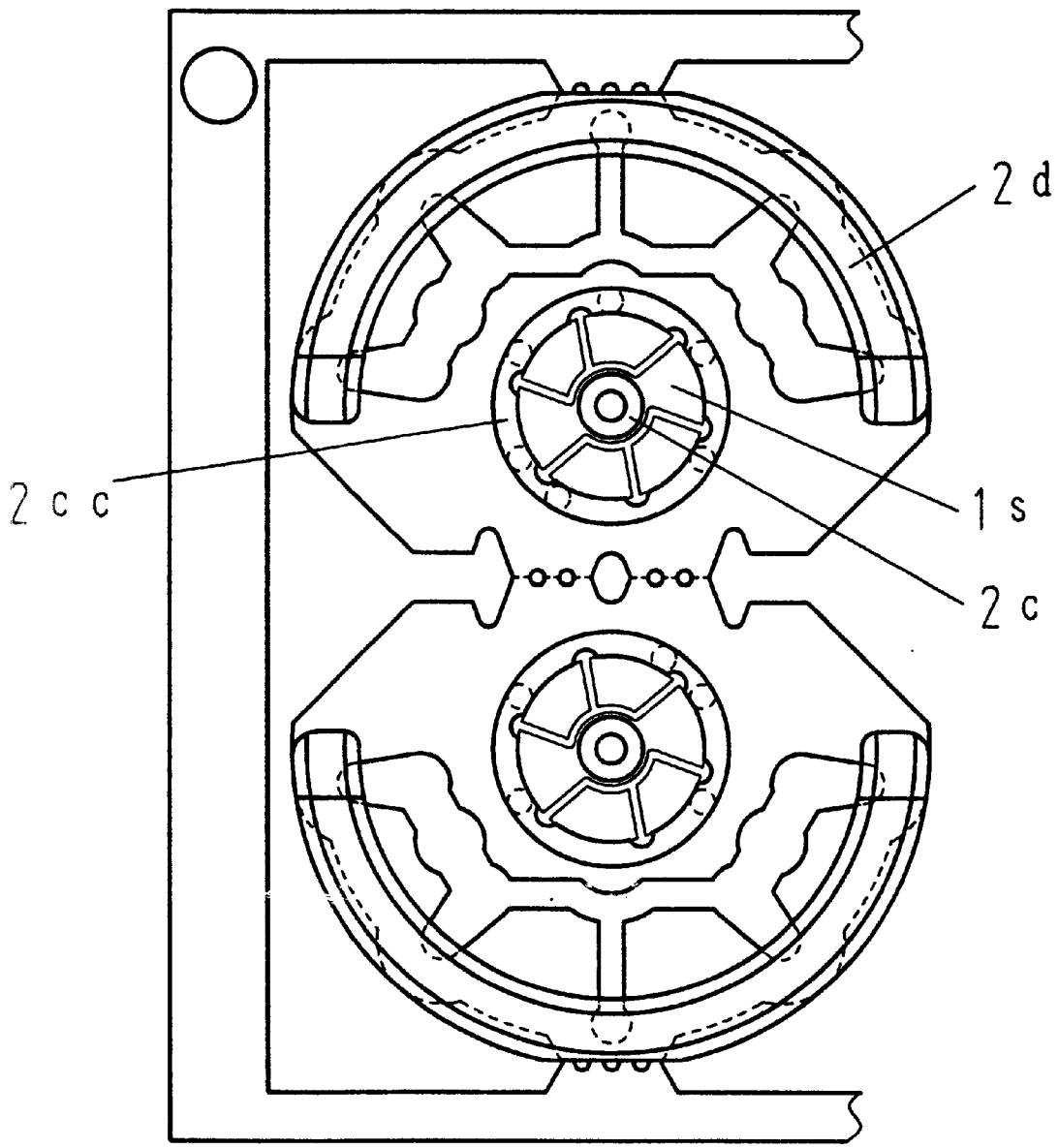
Figure 13:
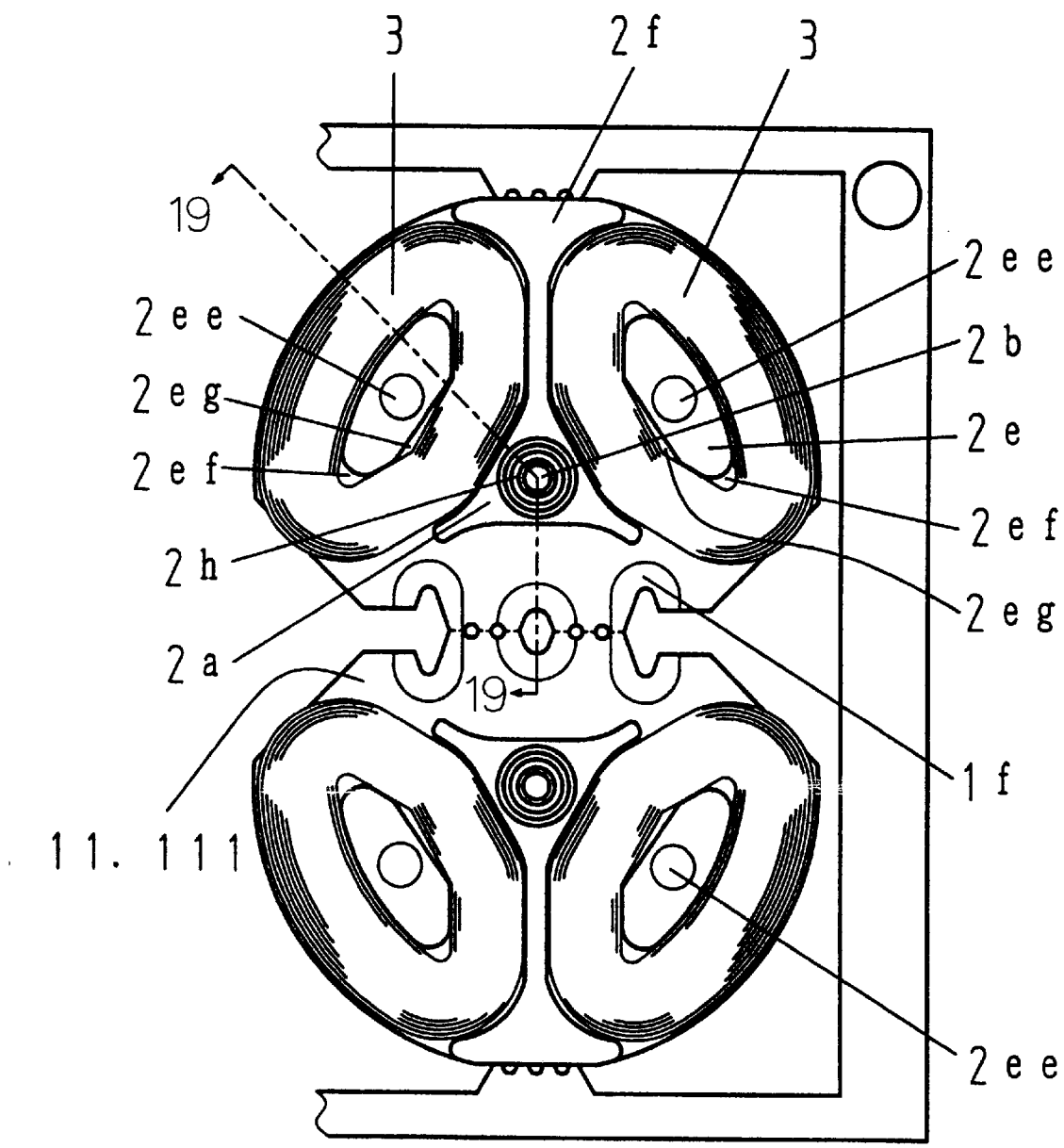
Figure 14:
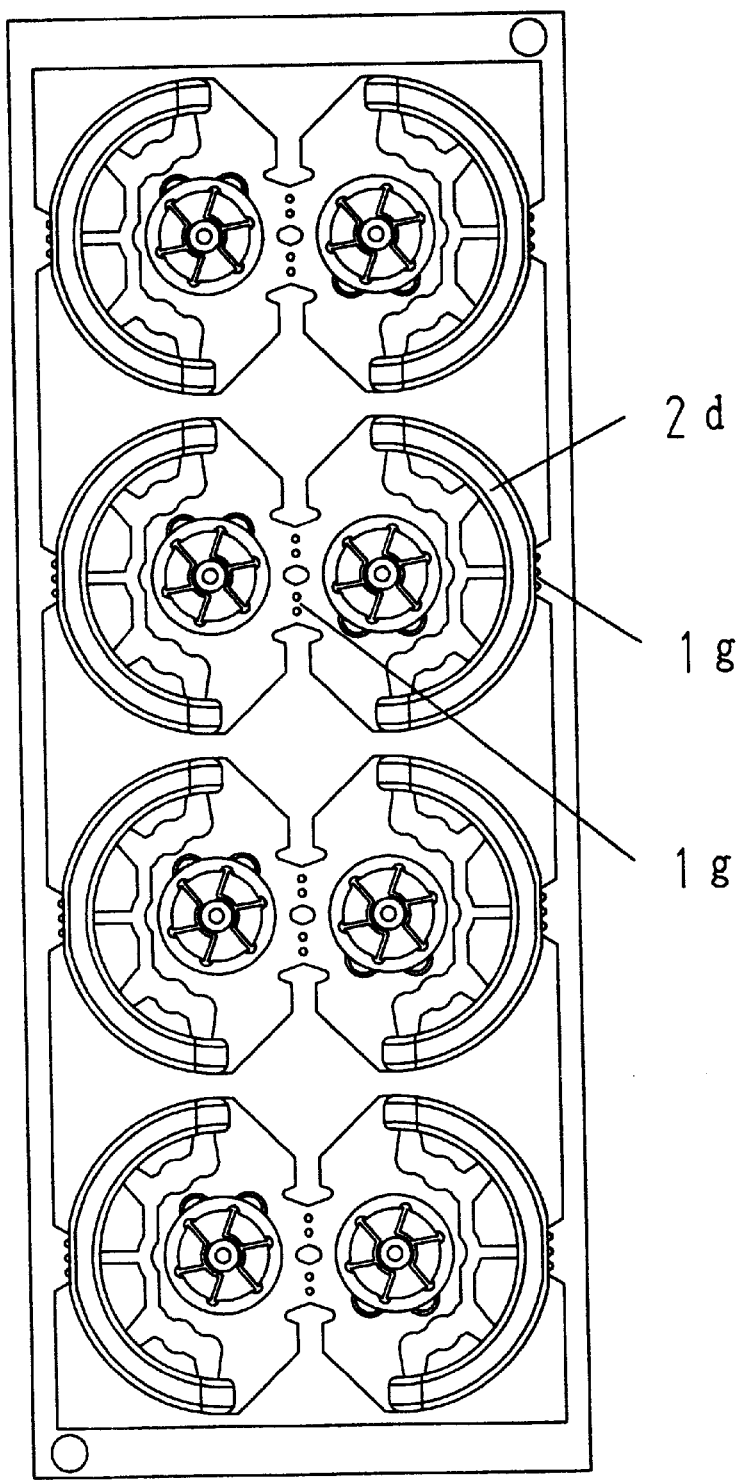

The printed wiring commutator device 11 manufactured in the above method, as shown in FIGS. 12, 13 and 14, is set to an injection mold installed by being connected plurally at the same pitch. By outset molding using resin of about specific gravity 4–5 and mobile friction coefficient of 0.3 (15 kg/cm$^2$), the resin holder 2a, the two air-core coil position determination guides 2e, and the part 2f of the eccentric weight connected to the resin bearing holder 2a are installed at the opposite side of the segment.

The bearing hole 2b rotatably installed at the shaft J which will be described later and the sliding portion 2h where the oil storing groove is coaxially installed are arranged at the resin holder 2a. The well-arranged and balanced leg portions penetrate the through holes 1A and the second dam portion 2cc at the surface and the first dam portion 2c at the central portion are coated with resin for reinforcement.

The part 2f of the eccentric weight lifts the other part 2d of the arc-shaped eccentric weight toward the segment through the resin passing portion 1j. Both ends of the other part 2d of the eccentric weight are tapered like the above leg shape to prevent loss of wind during rotation.

The air-core armature coils 3 and 3 are inserted in the air-core armature coil position determination guide 2e and the beginning and termination end portion of a winding are hooked and welded on the notch f of the three air-core coil end is connection terminals 1f, thus forming the eccentric rotor. In the drawing, r denotes a printed resistor for preventing spark.

Also, as a fixing unit of the air-core armature coil 3, preferably, a head portion 2ee of the air-core armature coil position determination guide 2e is pressed and welded by a heated wedge-shaped jig, or heated and cured by powdered epoxy or fixed in a reflow manner using an ultraviolet curing type adhesive. Also, although one phase is open in the three-phase armature coil, the description thereof will be omitted as the principle of operation is a well-know technology.

Figure 15:
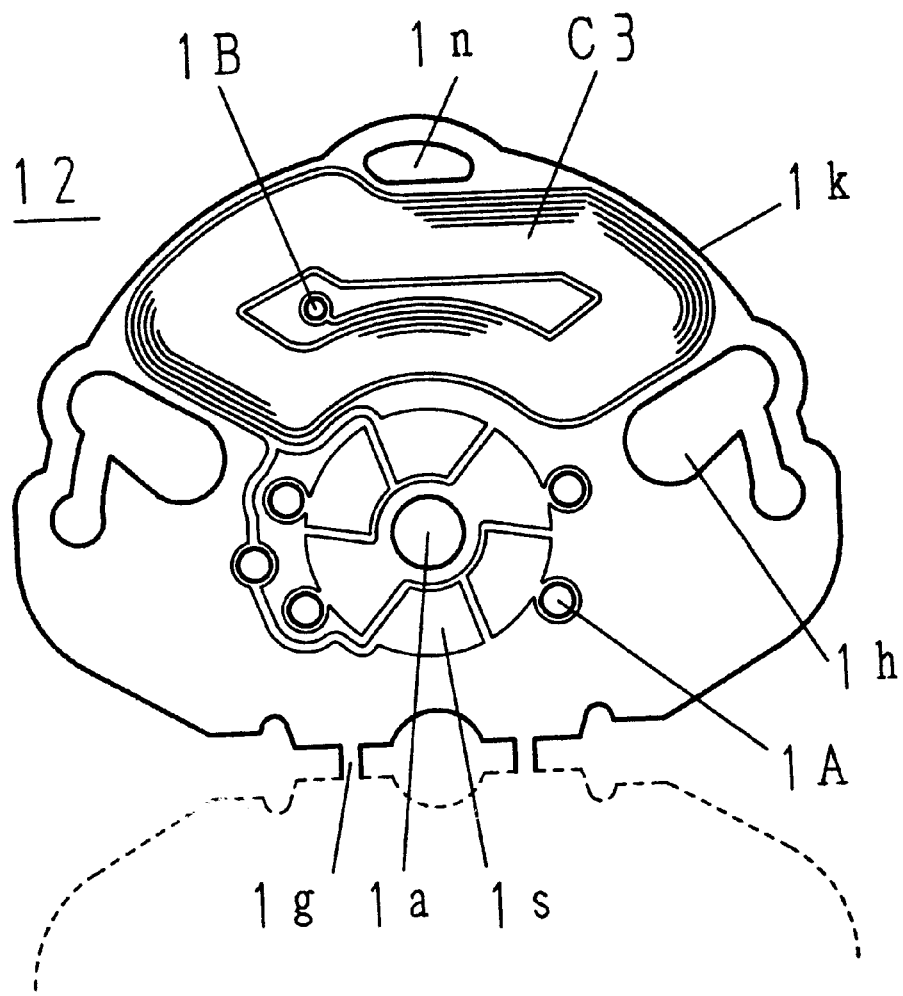
FIG. 15 is a cross sectional view of an eccentric rotor according to the third preferred embodiment of the present invention, which is viewed from the side of a segment.
Figure 16:
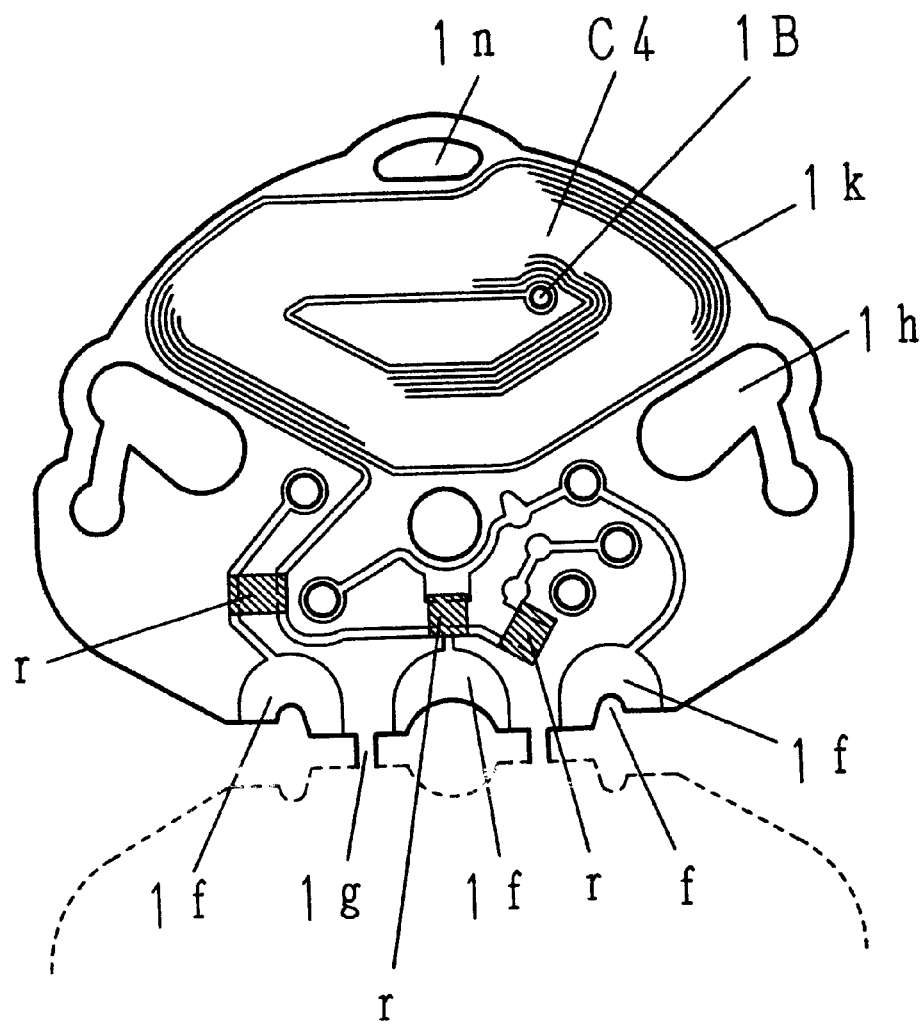
FIG. 16 is a plan view of the eccentric rotor of FIG. 15, viewed from the opposite side of the segment.

FIGS. 15 and 16 show an eccentric rotor according to the fourth preferred embodiment of the present invention. Here, reference numeral 12 denotes an eccentric printed wiring commutator device formed to be an expanded fan viewed from a plane, in which a shaft installation hole 1a is formed at the center thereof and simultaneously the six segments 1s of which surfaces are plated with the noble metal and having inclined slits installed at one side thereof for spark prevention. Part C3 of the armature coil is print-wired above the segments 1s and part C4 of the armature coil is print-wired on the other side of the eccentric printed wiring commutator 12 and the parts C3 and C4 are connected in series through the through hole 1A to characteristically form a single armature coil. The resin passing portions 1h, 1k and 1n, which are the characteristic feature of the present invention, are reinforced when the resin bearing holder, the air-core coil position determination resin guide, and the resin eccentric weight are integrally formed with the printed wiring commutator device 11 as described above. Of the resin passing portions, the resin passing portion 1h is hooked by the air-core coil position determination resin guide and the resin eccentric weight, the slit 1n and the resin passing portion 1k formed by notching part of the outer circumference are hooked by the resin eccentric weight, and the through hole 1A is hooked by the resin bearing holder. In the drawing, reference numeral 2ef denotes a space for drawing the end portion of the air-core armature coils 3 and 3.

Figure 18:
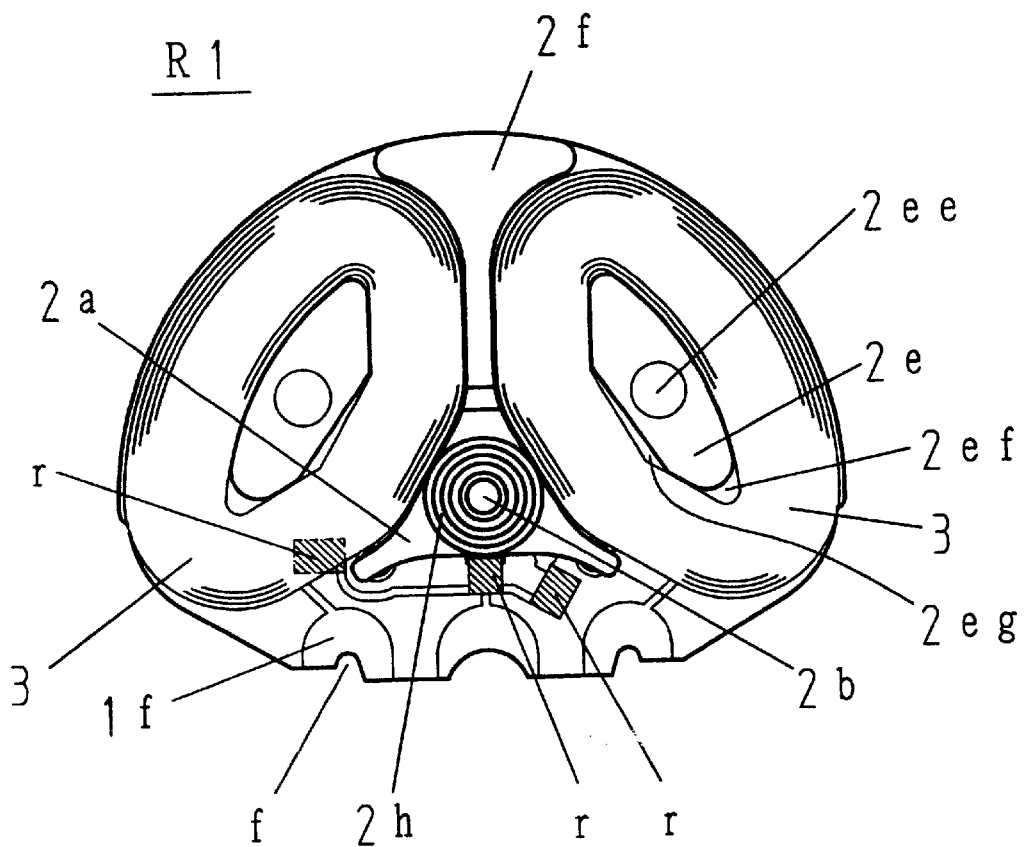
FIG. 18 is a cross sectional view of the eccentric rotor integrated with a resin holder and made to a non-mold type flat rotor, viewed from the opposite side of the segment.

The printed wiring commutator device 12 having the above structure is set to an injection mold by being connected plurally at the same pitch, as shown in FIG. 14. As shown in FIG. 18, by outset molding using resin of about specific gravity 4–5 and mobile friction coefficient of 0.3 (15 kg/cm$^2$), the resin holder 2a, the two air-core coil position determination guides 2e, and the part 2f of the eccentric weight connected to the resin bearing holder 2a are installed at the opposite side of the segment.

Figure 19:
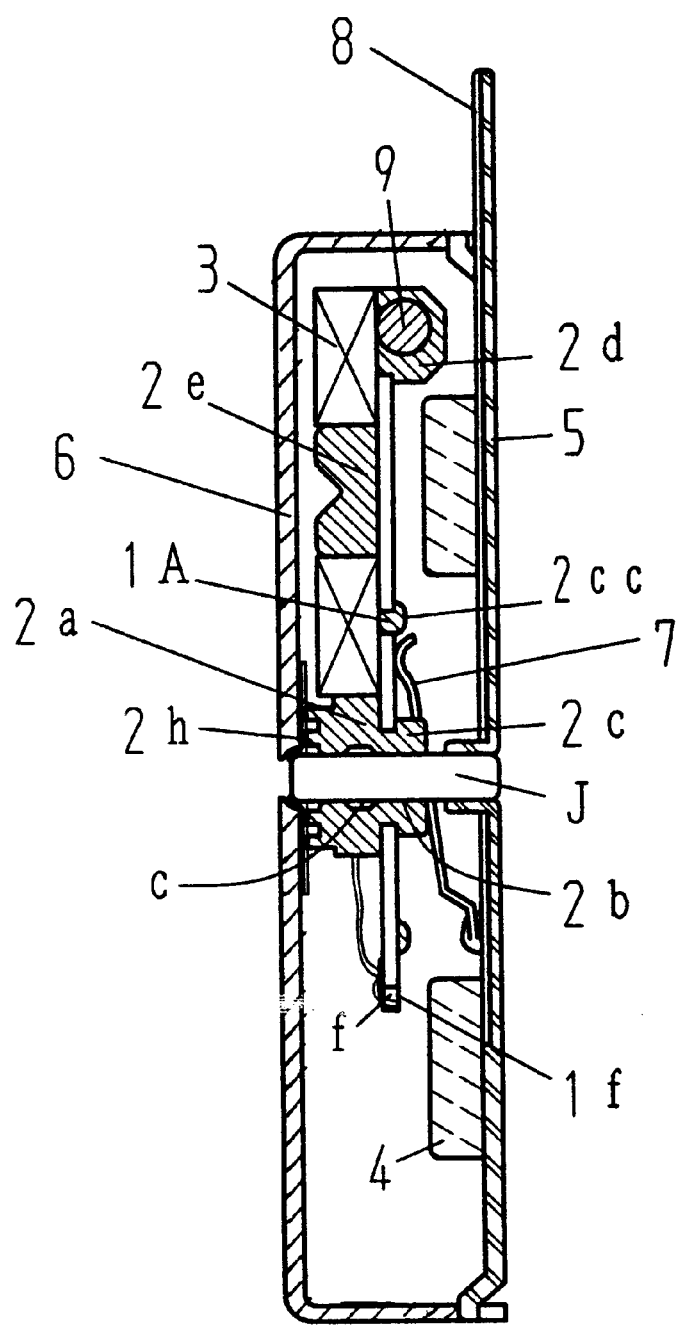
FIG. 19 is a vertical sectional view of an axial direction pore type coreless vibrator motor having an eccentric rotor, taken along line 9—9 of FIG. 13.

The axial direction pore type coreless vibrator motor using the above eccentric rotor R5 is assembled as shown in FIG. 19. Here, it is characteristic that an insulation copper wire 9 is embedded in the eccentric weight. In this case, the insulation copper wire 9 is coated with polyurethane except for cut-away portions of both ends thereof and formed to be arc-shaped so as not to be shorted by the printed wiring armature coil located inside. As a result, the position of the center can be moved much further so that vibrations become greater.

Figure 20:
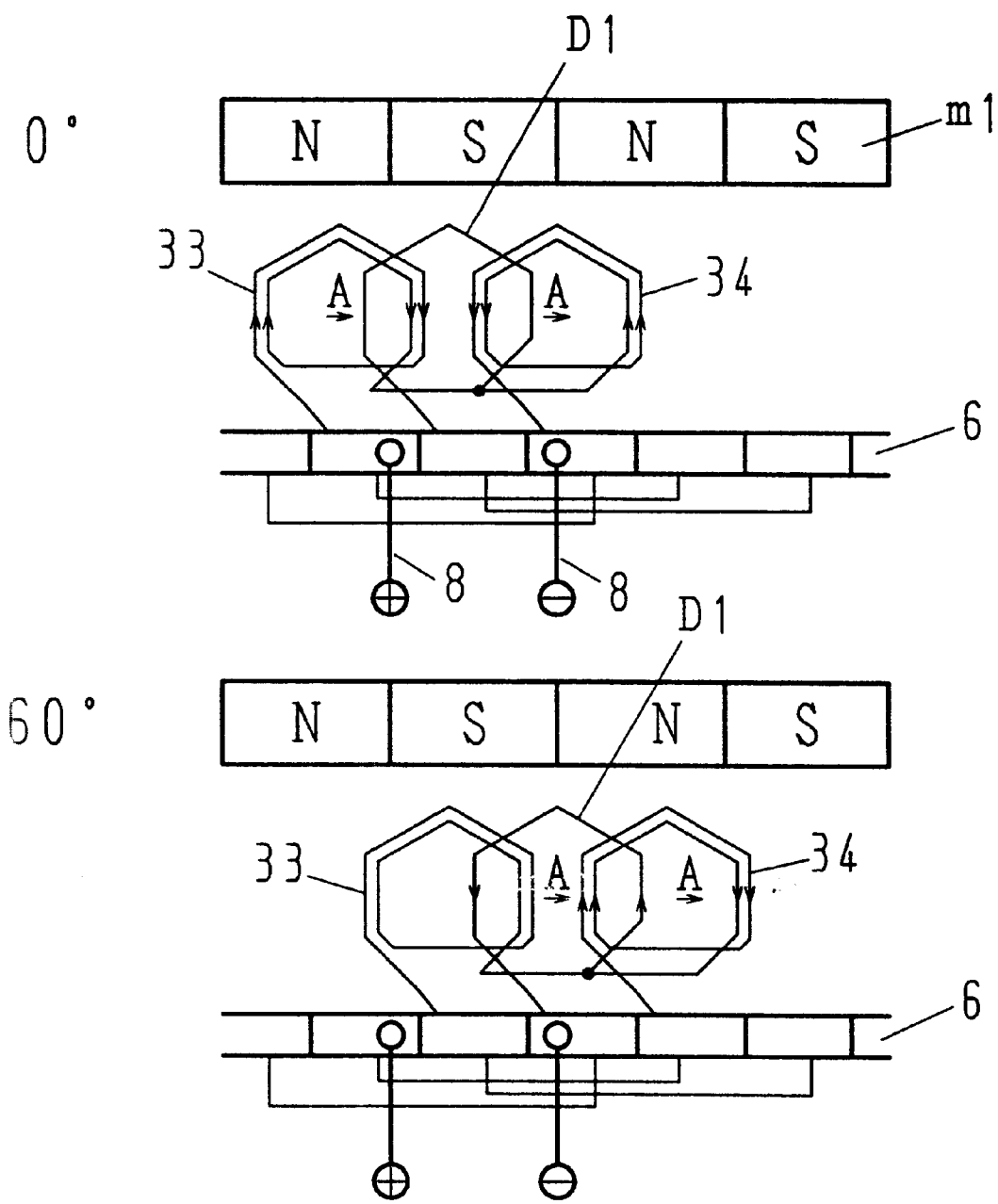
FIG. 20 is a view for explaining the operation of the axial direction pore type coreless vibrator motor using the above rotor.
Figure 21:
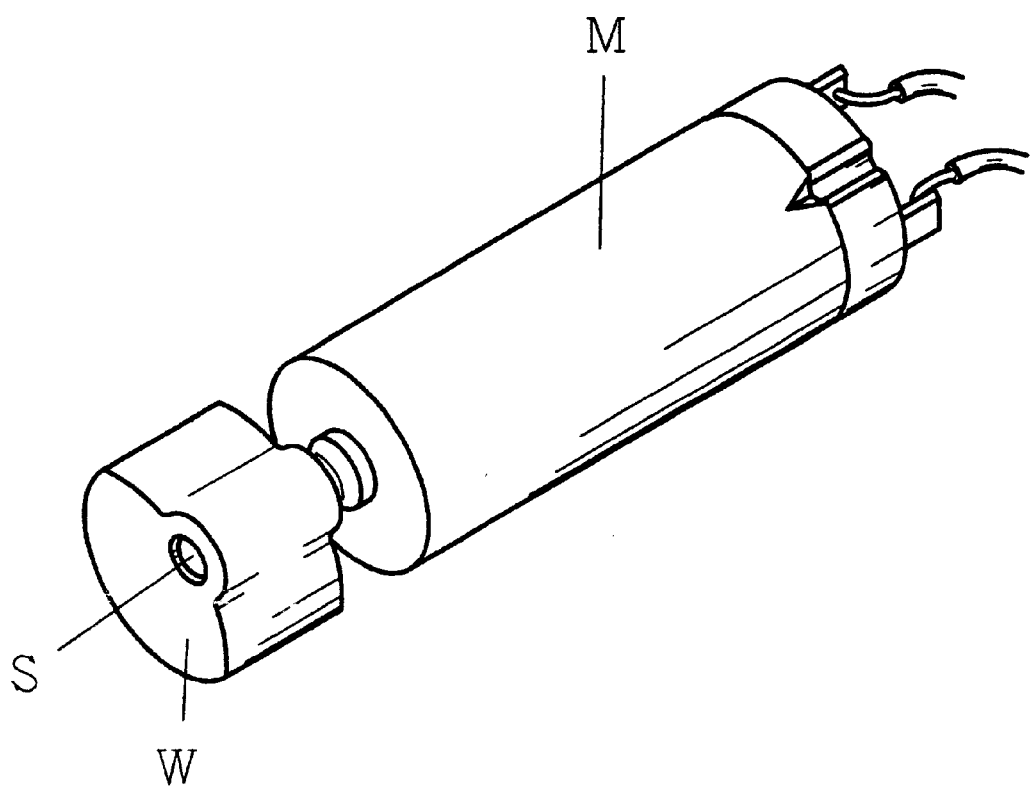
FIG 21 is a perspective view showing a conventional compact vibrator motor.

In the principle of the operation of the axial direction pore type coreless vibrator motor using the eccentric rotor R5, referring to FIG. 20, when a DC voltage by a power source (not shown) is applied to a pair of main and sub brushes 7 and 7, at the position of 0 degree, current flows in a direction indicated by arrows in the left and right winding type armature coils 3 and 3 via the printed wiring commutator and rotational torque in a direction indicated by arrow A is generated according to Fleming's left-hand rule. When the rotation proceeds to a degree of 60°, rotational torque in a direction of arrow A is generated to the printed wiring armature coil C3 and the winding type air-core armature coil 3. Anti-torque preventing rotation is not generated at other positions. Thus, as long as the power is supplied, the rotation continues cyclically. As two armatures are always electrically connected in three-phase three armatures, torque is improved compared to three-phase two armatures where one armature is open.

In the above embodiments of the present invention, it is obvious that various modifications can be made to detailed contents of the size, shape and structure thereof s long as the scopes of claims are met.

Also, it is preferable that, in integrally forming the resin holder 2a in the printed wiring commutator device, a part of copper pattern portion which is a boundary with the resin portion is made wider by mold so as not to be shorted.

As described above, in the compact vibrator motor having the above structure according to the present invention for obtaining vibrations with only an eccentric rotor, the connection between each end portion of the armature coil and the commutator is made easy, the armature coil can be easily fixed when installed to be inclined, particularly, mechanical noise can be reduced without using a sintered oil-storing bearing, the number of parts can be reduced by using the commutator as a bearing, and an eccentric rotor having a resin bearing portion which is advantageous in costs is available.

Also, to solve the problems of the conventional mold type rotor, in configuring a non-mold type flat rotor, the resin holder having a bearing portion and the air-core coil position determination guide are arranged using the printed wiring commutator device so that a sufficient maintenance intensity is secured and the property of sliding and the amount of eccentricity can be compatibly maintained.

Further, as the printed wiring coil is formed in the eccentric printed wiring commutator device forming the non-mold type flat rotor without sacrifice of the thickness, the problems or properties of the conventional mold type rotor can be solved. Thus, a low postured eccentric rotor, that is, a thin type vibrator motor can be provided. Also, using the advantages of the printed wiring commutator device, a method of manufacturing a non-mold type flat rotor capable of mass production can be provided.

In detail, the vibrator motor according to the present invention has the advantages as follows.

According to the invention as the end connection portion does not overlap the armature coil, the end portion is easily hooked as well as welding thereof. Great vibrations can be generated to the rotor itself during rotation by the winding type armature coil and the eccentric weight exhibiting density of over 3 which are integrally formed to be eccentric and in a non-mold manner.

According to the invention as a metal bearing is not needed, production costs can be lowered.

According to the invention a thin cored vibrator motor can be obtained.

According to the invention the armature coil wound around the non-magnetized salient pole becomes a pseudo coreless winding to contribute to the rotational torque. Cogging torques of two magnetized salient poles facing each other are offset and decreased and the amount of movement of the center of the eccentricity accentuating non-magnetized salient pole is increased.

According to the invention as the printed wiring commutator device itself is formed to be eccentric, the eccentric air-core coil position determination guide or the eccentric weight is easily installed.

According to the invention as the printed wiring commutator device becomes a main frame, the air-core armature coil position determination guide and the resin eccentric weight can be maintained at high intensity.

According to the invention as the resin bearing holder, the air-core coil position determination guide, and the resin eccentric weight can be formed through a single injection-molding, efforts rendered in the process can be reduced and, as all the above elements are connected together, a high intensity can be maintained.

According to the invention as the resin bearing holder can be maintained at a high intensity, impacts in the latitudinal direction with respect to the eccentric rotor can be endured.

According to the invention a thin axial direction pore type coreless vibrator motor can be provided.

According to the invention due to at least one armature coil formed in print-wiring, an eccentric rotor having three-phase overlapped armature coil is available with sacrifice of the thickness. As a conductive body contributing to torque is increased, an effective eccentric rotor is obtained.

According to the invention as the number of windings of at least one armature coil formed in print-wiring increases, more effective eccentric rotor is available.

According to the invention an eccentric rotor having a large amount of eccentricity, without a metal bearing, is possible and a flat vibrator motor having the rotor is possible.

According to the invention mass production of eccentric rotors is possible.

According to the invention the mass production of eccentric rotor is possible.

According to the invention a high density eccentric weight can be used so that a motor generating greater vibrations is obtained.

What is claimed is:

1. An eccentric rotor comprising:
    a printed wiring commutator device having first and second surfaces and including a central hole for shaft installation and a plurality of segment patterns at a periphery of the first surface;
    a wound, integral, non-molded armature coil mounted on the second surface of said printed wiring commutator device and eccentric relative to the central hole of said printed wiring commutator device;
    an end connection located at an outer circumferential portion of said printed wiring commutator device so that latching of an end portion of said wound armature coil is possible within a range, without deviating from a turning circumference, during rotation, and simultaneously electrically connected with the segment patterns, and not overlapping said wound armature coil, when viewed in a plane;
    a resin bearing holder inserted in the central hole with a first part protruding toward the segment patterns and a second part extending toward the second surface of said printed wiring commutator device; and
    an eccentric resin weight having a density exceeding 3 installed at said printed wiring commutator device.

2. The eccentric rotor as claimed in claim 1, wherein said resin bearing holder has a mobile friction coefficient not exceeding 0.4 (1.5 Kg/cm$^2$) and is installed in a bearing hole coaxial with the central hole.

3. The eccentric rotor as claimed in claim 2, wherein said resin bearing holder and said eccentric resin weight are connected by resin.

4. A compact vibrator motor comprising:
    eccentric rotor of claim 3;
    a shaft supporting said eccentric rotor for rotating; and
    a housing accommodating said eccentric rotor and a magnet for applying a magnetic force to said eccentric rotor.

5. The eccentric rotor as claimed in claim 2, wherein said printed wiring commutator device includes a through hole as a resin passing portion and said resin bearing holder is an integral part of said printed wiring commutator device.

6. A compact vibrator motor comprising:
    eccentric rotor of claim 5;
    a shaft supporting said eccentric rotor for rotating; and
    a housing accommodating said eccentric rotor and a magnet for applying a magnetic force to said eccentric rotor.

7. The eccentric rotor as claimed in claim 1, wherein said resin bearing holder and said eccentric resin weight are connected by resin.

8. A compact vibrator motor comprising:
    eccentric rotor of claim 7;
    a shaft supporting said eccentric rotor for rotating; and
    a housing accommodating said eccentric rotor and a magnet for applying a magnetic force to said eccentric rotor.

* * * * *